(12) United States Patent
Avery et al.

(10) Patent No.: US 9,360,972 B1
(45) Date of Patent: Jun. 7, 2016

(54) TOUCH SENSOR CONDUCTOR ROUTING

(71) Applicant: Cypress Semiconductor Corporation, San Jose, CA (US)

(72) Inventors: Benjamin James Avery, Seattle, WA (US); Cole D. Wilson, Everett, WA (US); Jonathan R. Peterson, Everett, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 324 days.

(21) Appl. No.: 13/801,094

(22) Filed: Mar. 13, 2013

Related U.S. Application Data

(60) Provisional application No. 61/752,270, filed on Jan. 14, 2013.

(51) Int. Cl.
*G06F 3/041* (2006.01)
*G06F 3/044* (2006.01)
*G06F 12/02* (2006.01)

(52) U.S. Cl.
CPC ............ *G06F 3/044* (2013.01); *G06F 12/0207* (2013.01)

(58) Field of Classification Search
CPC .......... G06F 3/044; G06F 2203/04112; G06F 2203/04111; G06F 1/1643; G06F 1/169; G06F 3/041; G06F 12/0207
USPC .................................................. 345/173, 174
See application file for complete search history.

(56) References Cited

U.S. PATENT DOCUMENTS

| | | | |
|---|---|---|---|
| D500,037 S | 12/2004 | Ozolins et al. | |
| 8,264,135 B2 * | 9/2012 | Ozolins | G02F 1/1333 220/2.1 R |
| 8,723,825 B2 * | 5/2014 | Wright | G06F 3/0416 345/156 |
| 2007/0008299 A1 * | 1/2007 | Hristov | G06F 3/0416 345/173 |
| 2008/0309633 A1 * | 12/2008 | Hotelling | G06F 3/0412 345/173 |
| 2009/0109366 A1 | 4/2009 | Lippey | |
| 2009/0303189 A1 * | 12/2009 | Grunthaner | G06F 3/044 345/173 |
| 2010/0059294 A1 * | 3/2010 | Elias | G06F 3/044 178/18.06 |
| 2010/0302201 A1 * | 12/2010 | Ritter | G06F 3/044 345/174 |
| 2011/0012845 A1 * | 1/2011 | Rothkopf | G06F 3/044 345/173 |
| 2011/0019260 A1 | 1/2011 | Mccabe et al. | |
| 2011/0209093 A1 | 8/2011 | Hinckley et al. | |
| 2012/0200536 A1 | 8/2012 | Cornish et al. | |
| 2012/0227259 A1 * | 9/2012 | Badaye | G06F 3/044 29/846 |
| 2012/0287386 A1 | 11/2012 | Kajiya et al. | |

OTHER PUBLICATIONS

Cypress Semiconductor Corporation, TrueTouch® Touchscreen Controllers webpage [online], <URL:http://www.cypress.com/touch/>.

(Continued)

*Primary Examiner* — Thomas Alunkal

(57) ABSTRACT

An example apparatus includes a sensing area including a sensor matrix, a first conductor and a second conductor. The first conductor is coupled to a first sensor of the sensor matrix and is configured to be coupled to a sensing module. The second conductor is coupled to a second sensor of the sensor matrix and is configured to be coupled to the sensing module. In embodiments, the first sensor consumes a first area, the second sensor and a length of the first conductor reside within a second area that is smaller than or equal to the first area consumed by the first sensor, and the length of the first conductor is routed between an edge of the sensing area and the second sensor.

17 Claims, 12 Drawing Sheets

(56) References Cited

OTHER PUBLICATIONS elo Touch Solutions, "1919L 19" LCD Desktop Touchmonitor," [retrieved on Jun. 11, 2014], retrieved from <URL:http://www.touchwindow.com/mm5/graphics/00000001/elo/ELO-1919L-brochure.pdf>; 2 pages.

elo Touch Solutions, AccuTouch Zero-Bezel Five-Wire Resistive Touchscreens, [retrieved on Jun. 11, 2014], retrieved from <URL: http://media.elotouch.com/pdfs/datasheets/DS000063__AccuTouch_ZB_b.pdf>; 2 pages.

Walker, Geoff, "Fundamentals of Projected-Capacitive Touch Technology," [online], Society for Information Display Display Week 2014, [retrieved on Jun. 11, 2014], retrieved from Wlaker Mobile, LLC, <URL: www.walkermobile.com/Touch_Technologies_Tutorial_Latest_Version.pdf>; 315 pages.

* cited by examiner

TOUCH SENSOR CONDUCTOR ROUTING

RELATED APPLICATIONS

This application claims the priority benefit of U.S. Provisional Application No. 61/752,270, filed Jan. 14, 2013, which is incorporated herein by reference in its entirety.

TECHNICAL FIELD

The subject matter relates to the field of touch sensors. More specifically, but not by way of limitation, the subject matter discloses techniques for routing conductors for touch sensors.

BACKGROUND

Computing devices, such as notebook computers, personal digital assistants, mobile communication devices, portable entertainment devices (e.g., handheld video game devices, multimedia players), and set-top-boxes (e.g., digital cable boxes, digital video disc (DVD) players) may include user interface devices that facilitate interaction between a user and the computing device.

One type of user interface device that has become more common operates by way of capacitance sensing. A capacitance sensing system may include a touchscreen, touch-sensor pad, a touch-sensor slider, or touch-sensor buttons, and may include an array of one or more capacitive sensor elements. Capacitive sensing typically involves measuring, through sensor signals, a change in capacitance associated with the capacitive sensor elements to determine a presence of a conductive object relative to the capacitive sensor elements. The face of a touchscreen capacitance sensing system, which displays images, is sometimes partially covered by an opaque material to hide capacitance sensing circuitry from the user.

BRIEF DESCRIPTION OF THE DRAWINGS

Some embodiments are illustrated by way of example and not limitation in the figures of the accompanying drawings in which.

DETAILED DESCRIPTION

Touch sensor conductor routing is described. In the following description, for purposes of explanation, numerous examples are set forth in order to provide a thorough understanding of the embodiments. It will be evident to one skilled in the art that the claimed subject matter may be practiced in other embodiments. The detailed description discloses examples of technology that, among other things, routes traces of a sensor matrix within a sensing area, along one or more edges of a sensing area. Some embodiments are now briefly introduced and then discussed in more detail along with other embodiments beginning with FIG. 1.

Touchscreen devices such as mobile phones sometimes include bezels (e.g., an opaque overlay) bordering the edges of a touchscreen to hide otherwise visible touch sensor conductors (e.g., traces) coupled to a touch controller. Where a bezel is used, the touchscreen display typically does not display images. Some touchscreen devices avoid using bezels on one or more edges by routing transparent touch sensor traces between columns of sensors or rows of sensors of the panel's sensor matrix. This technique may allow the touchscreen display to display images where the bezels would have been but the resolution of touches is negatively affected by increased spacing between touch sensors and the signal quality can suffer due to signal coupling of the routed traces.

Embodiments described herein can avoid using bezels on one or more edges by routing transparent touch sensor traces between the edge of a sensing area and sensors of the sensing area instead of routing the traces between the sensors or outside of the sensing area. This edge routing can support touch sensing anywhere within the sensing area with improved touch resolution and signal quality compared to other routing techniques. The embodiments described herein help maximize the display area of a touchscreen because images can be displayed and touch sensing can be supported in the areas of the touchscreen where the use of a bezel is avoided.

The detailed description below includes references to the accompanying drawings, which form a part of the detailed description. The drawings show illustrations in accordance with embodiments. These embodiments, which are also referred to herein as "examples," are described in enough detail to enable those skilled in the art to practice embodiments of the claimed subject matter. The embodiments may be combined, other embodiments may be utilized, or structural, logical, and electrical changes may be made without departing from the scope of what is claimed. The following detailed description is, therefore, not to be taken in a limiting sense, and the scope is defined by the appended claims and their equivalents.

Figure 1:
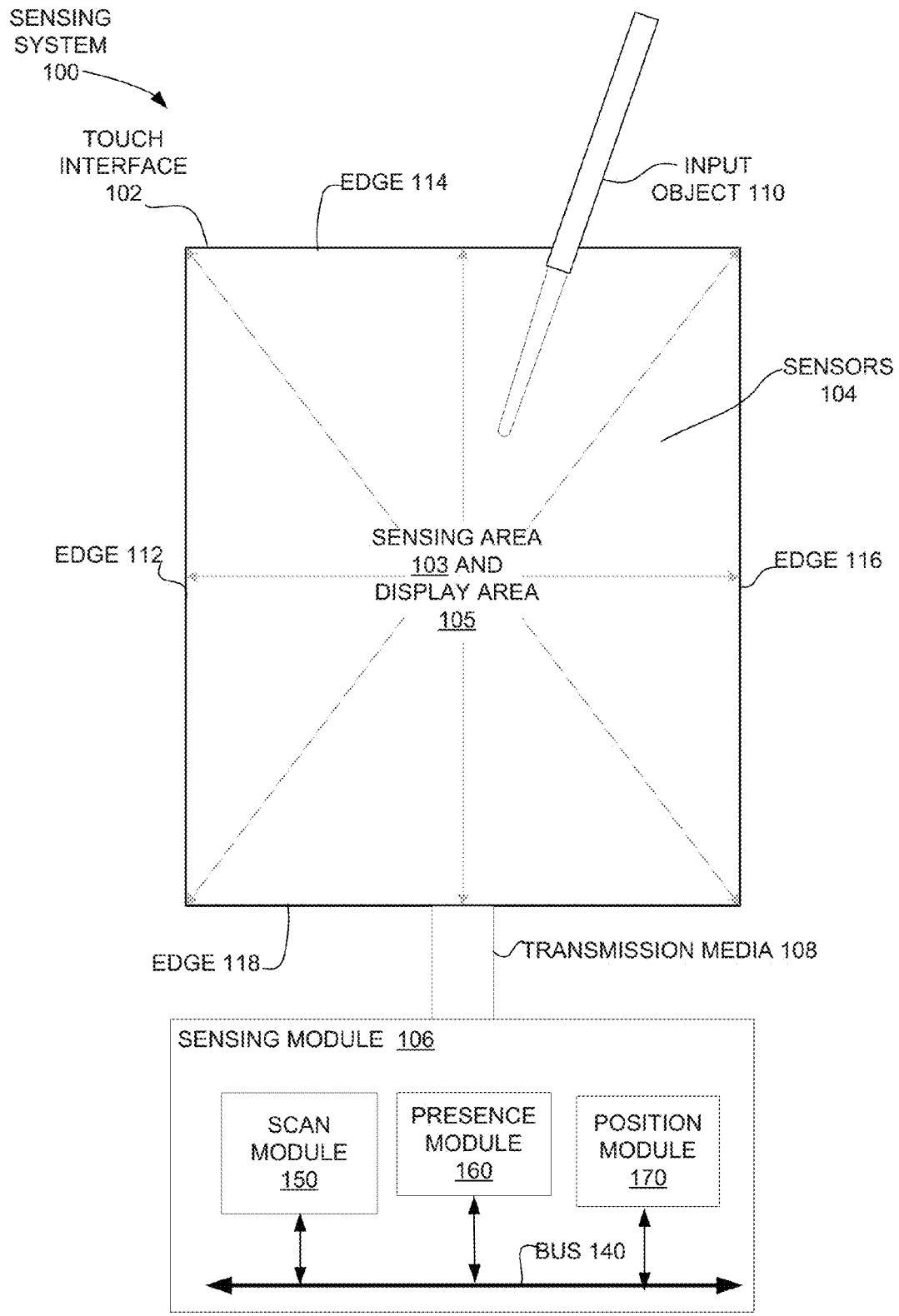
FIG. 1 is a block diagram illustrating a sensing system, in accordance with various embodiments.

FIG. 1 is a block diagram illustrating a sensing system 100, in accordance with various embodiments. The sensing system 100 includes a touch interface 102 coupled with a sensing module 106 (e.g., which may provide functionality of a touch controller) through transmission media 108. The touch interface 102 receives input from a user in a sensing area 103 through an input object 110 (e.g., a stylus, a finger, or any other object used to provide input). The touch interface 102 may include a touch pad, a touchscreen, or any touch input interface. In various embodiments, the sensing system 100 may provide sensing for a touchscreen, a touchpad, a slider, a button, a switch, a level sensor, a proximity sensor, a displacement sensor, a combination thereof, or provide some other functionality based on a detection of a user input.

The sensing area 103 includes sensors 104. In various example embodiments, the sensors 104 may include one or more of light-sensitive elements, light emitting elements, photosensitive elements, pressure sensitive elements, and/or capacitive sensor elements. In embodiments described herein the sensing area 103 overlaps with a display area 105 in which information is displayed to the user. In an embodiment, the sensing area 103 is the same size as the display area 105 and touches can be sensed wherever images are displayed. For example, the sensing area 103 and the display area 105 may share common edges 112, 114, 116, and 118.

In some embodiments, the sensors 104 are embedded into an image display of the touch interface 102. This is sometimes referred to as in-cell sensing. For example, a photosensitive element may be embedded into each display pixel within the display area 105. The photosensitive elements sense light reflected by an input object back into the cell, or may detect a shadow cast by an object on the surface of the touch interface 102.

The input object 110 is shown to be proximate to or in contact with the touch interface 102 and is used to provide input to the touch interface 102. In this example, the input object 110 is a stylus. In an embodiment, the diameter of the stylus is around 1 mm, which is less than the diameter of a typical finger. The input object 110 may be a non-conductive object, a conductive object, and/or may produce light or other energy to be sensed through the sensors 104, without departing from the claimed subject matter. In an embodiment, the input object 110 is passive meaning that it is not electrically powered to provide input to the touch interface 102. Alternatively or additionally, the input object 110 may be active meaning that it is electrically powered to provide input to the touch interface 102.

The input object 110 may be fixed in position or moveable in position relative to the touch interface 102. For example, a user may move the input object 110 relative to the touch interface 102. The user may include a human, a mechanism, a machine, and/or programmed instructions. Alternatively or additionally, the touch interface 102 may be allowed to move relative to a fixed or movable input object 110.

The sensing module 106 senses or detects, using the sensors 104, a presence of one or more input objects proximate to or in contact with one or more of the sensors 104. The sensing module 106 may perform operations (e.g., scan operations) to detect, using the sensors 104, signals indicating the presence of the one or more input objects.

The transmission media 108 may include any medium appropriate for the scan operations and through which the sensor signals may be conveyed. For some embodiments, the transmission media 108 includes metal traces (e.g., copper wire), transparent conductive material (e.g., indium tin oxide (ITO) traces), or another conductive material coupled directly or indirectly to the sensors 104. As will be discussed below, some portions (e.g., ITO traces) of the transmission media 108 may be located within the sensing area 103 and other portions may be located outside of the sensing area 103. In some embodiments, all or a portion of the ITO traces coupling sensors 104 to the sensing module 106 may be located outside of the sensing area 103. Visible transmission media located outside the sensing area 103 may be hidden with a bezel (not shown) made from an opaque material. For some embodiments, the transmission media 108 includes a flexible printed circuit board (not shown) that couples the touch interface 102 with the sensing module 106 (e.g. a touch controller).

Depending on the type of sensors used and what properties they sense, a sensor signal may indicate a pressure applied to the touch interface 102, light (e.g., infrared light) associated with an input object, an image associated with an input object, a capacitance of the sensors 104 and/or a change in capacitance of one or more of the sensors 104 when an input object is proximate to or in contact with the touch interface 102.

The sensing module 106 includes a scan module 150, a presence module 160, and a position module 170 coupled to one another through a bus 140, any of which may be implemented using hardware, software, or a combination of hardware and software. In an embodiment, the scan module 150 scans the sensors 104 of the touch interface 102 for sensor signals and the presence module 160 can determine, based on the sensor signals, whether one or more conductive objects are proximate to or in contact with the touch interface 102. A detected touch may include one actual touch or multiple actual touches. The position module 170 determines a position of a detected touch.

In an example scan operation, the scan module 150 excites one or more of the sensors 104 and then receives, from the same or other of the sensors 104 a sensor signal that reflects a capacitance associated with the excited one or more sensors 104 and the associated input object(s). It will be noted that the number of targeted sensors may be varied from scan to scan. The scan module 150 may include an analog-to-digital converter (not shown) to convert sensor signals, which in this embodiment are analog captures of voltage and charge, to digital representations. The presence module 160 can then detect presence of a conductive object if, for example, the digital value meets or exceeds a threshold of an equivalent capacitance or falls within upper and lower threshold levels. The position module 170 may then determine a position of the detected presence based on the location of the one or more sensors where a presence was detected. Various electrode configurations can be used to form the sensors 104. An example arrangement of electrodes and sensing operations are now discussed with respect to FIGS. 2 and 3.

Figure 2:
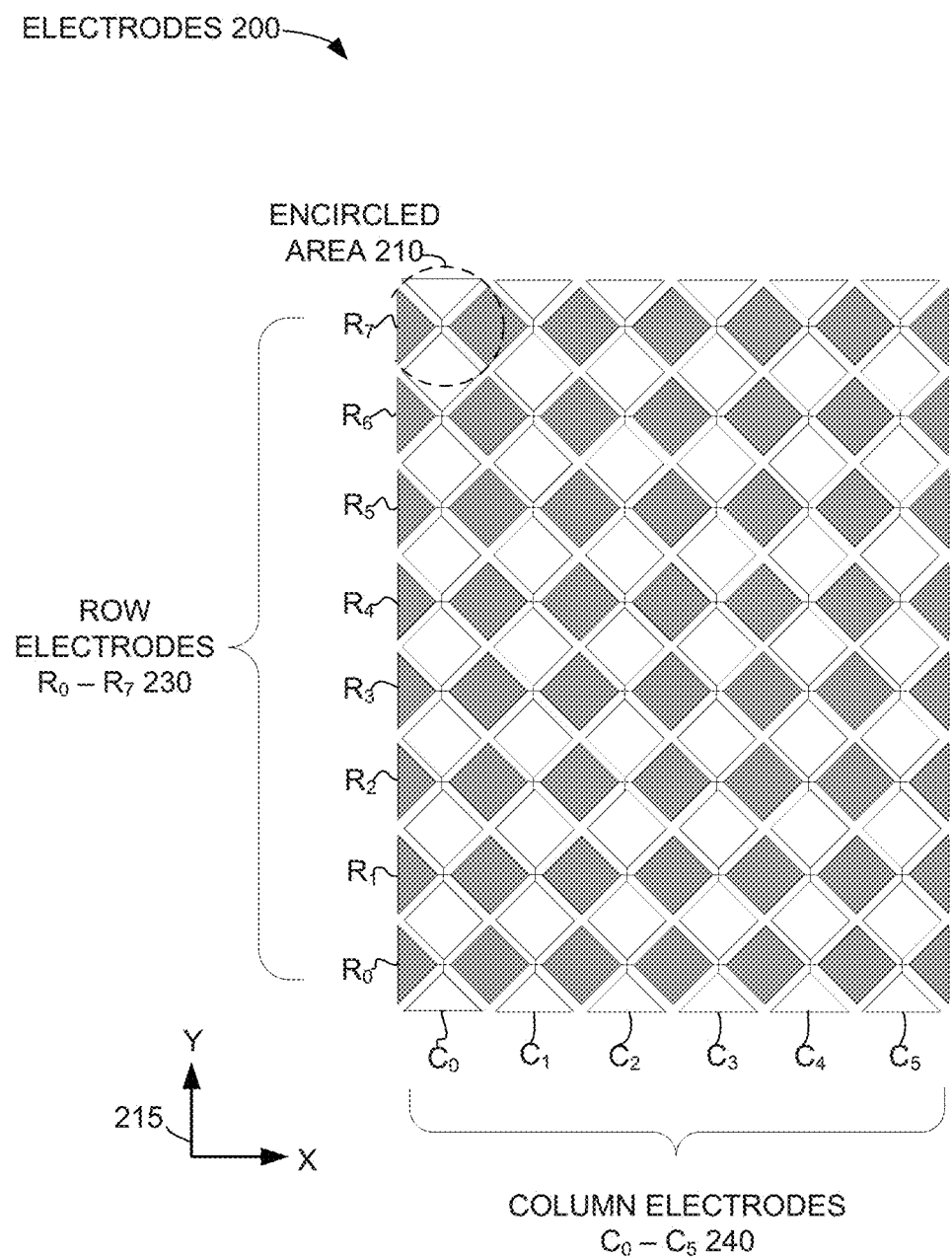
FIG. 2 is a block diagram illustrating electrodes of a sensing area, in accordance with embodiments.

FIG. 2 is a block diagram illustrating electrodes 200 of the sensing area 103 of FIG. 1, in accordance with embodiments. In FIG. 2, the electrodes 200 includes row electrodes $R_0$-$R_7$ 230 crossing with column electrodes $C_0$-$C_5$ 240. In an embodiment, galvanic isolation is maintained between the row electrodes $R_0$-$R_7$ 230 and the column electrodes $C_0$-$C_5$ 240. The row electrodes and the column electrodes may be formed in a same layer of a substrate or different layers of a substrate, without departing from the claimed subject matter. The row electrodes 230 and the column electrodes 240 can form multiple capacitance sensors to be measured by the sensing module 106 of FIG. 1 through scan operations. Example scan operations are discussed below. Row conductors (not shown) and column conductors (not shown) couple the row electrodes 230 and column electrodes 240, respectively, to the sensing module 106 of FIG. 1. Although the designation can be switched, the column electrodes 240 in this example are transmit (TX) electrodes that are excited (e.g., charged) in the scan operation and the row electrodes 230 are receive (RX) electrodes from which sensor signals reflecting capacitance are received.

Each row electrode and column electrode is shown to include a half diamond shape at its ends full diamond shapes in between its ends. One or more of the electrodes may be formed of other shapes (e.g., lines, stripes, bars, triangles, snowflakes, and/or any other curved or polygonal shape) and may be organized in various other patterns (e.g., intersections, concentric circles, saw tooth pattern, Manhattan pattern, and/or other patterns) without departing from the claimed subject matter.

As introduced above, the scan module 150 of FIG. 1 can scan the sensors 104 of the touch interface 102 for sensor signals that reflect a capacitance of the sensors. The sensor signal that reflects the capacitance may reflect a self-capacitance between one or more of the electrodes 200 and a ground reference (not shown). For example, the scan module 150 may excite (e.g., apply a signal to) an electrode (e.g., the electrode of row $R_7$) and then receive, through the same electrode, a sensor signal that represents the self-capacitance between the electrode of row $R_7$ and the ground reference. In an embodiment, the presence module 160 can detect the presence of a touch based on a difference between the measured self-capacitance when a touch is not present and the measured self-capacitance when a touch is present. This is an example of an axial scan mode in which a sensor signal of each scanned electrode can indicate presence of an input object relative to that electrode but does not indicate where along the electrode the presence is located. For some embodiments, self-capacitance scans consume less energy (e.g., due to shorter scan time and fewer measurements needed) than the mutual-capacitance scans discussed below.

Alternatively or additionally, the sensor signal that reflects the capacitance may reflect a mutual-capacitance between two or more of the electrodes 200. For example, the scan module 150 may excite a transmit electrode (e.g., the electrode of column $C_0$) and then receive, through a receive electrode (e.g., the electrode of row $R_7$), a sensor signal that represents a mutual-capacitance where the transmit electrode and the receive electrode cross. The presence module 160 can detect the presence of a touch based on the measured mutual-capacitance when the touch is not present and the measured mutual-capacitance when the touch is present. This is an example of an all points addressable scan mode in which the change in mutual-capacitance of each scanned transmit-receive electrode intersection can indicate presence at that intersection.

In an embodiment, each electrode (e.g., the electrodes of columns $C_0$-$C_5$) is associated with a position coordinate (e.g., an X-coordinate) in an X-Y axis 215. The position module 170 can determine the position coordinate (e.g., the X-coordinate) of a touch as the position coordinate of the electrode where the peak change in sensor signal, for example, is observed. Alternatively or additionally, the position module 170 may determine the position coordinate of the touch through finding the centroid of sensor signals distributed over multiple adjacent electrodes. In an embodiment, the scan module 150 can switch the designation of transmit and receive electrodes between the rows $R_0$-$R_7$ and the columns $C_0$-$C_5$ and the presence module 160 and position module 170 can detect presence and determine position (e.g., X-Y position) along multiple axes (e.g., in the X-Y plane) based on the switched designation of transmit and receive electrodes.

The scan module 150 may include or utilize a multiplexer or switch matrix (not shown) to distribute excitation signals to one or more selected electrodes where the selected electrodes are the total set or a subset of the total set of electrodes available for excitation. Likewise, the scan module 150 may include or utilize the same or a different multiplexer (not shown) to receive sensor signals from one or more selected electrodes. In this way, the scan module 150 can scan selected portions or areas (e.g., targeted portions) of a capacitive sensor matrix in an axial scan mode and/or an all points addressable scan mode for presence of an input object. A touch sensor formed by sensor elements within the encircled area 210 is described with respect to FIG. 3.

Figure 3:
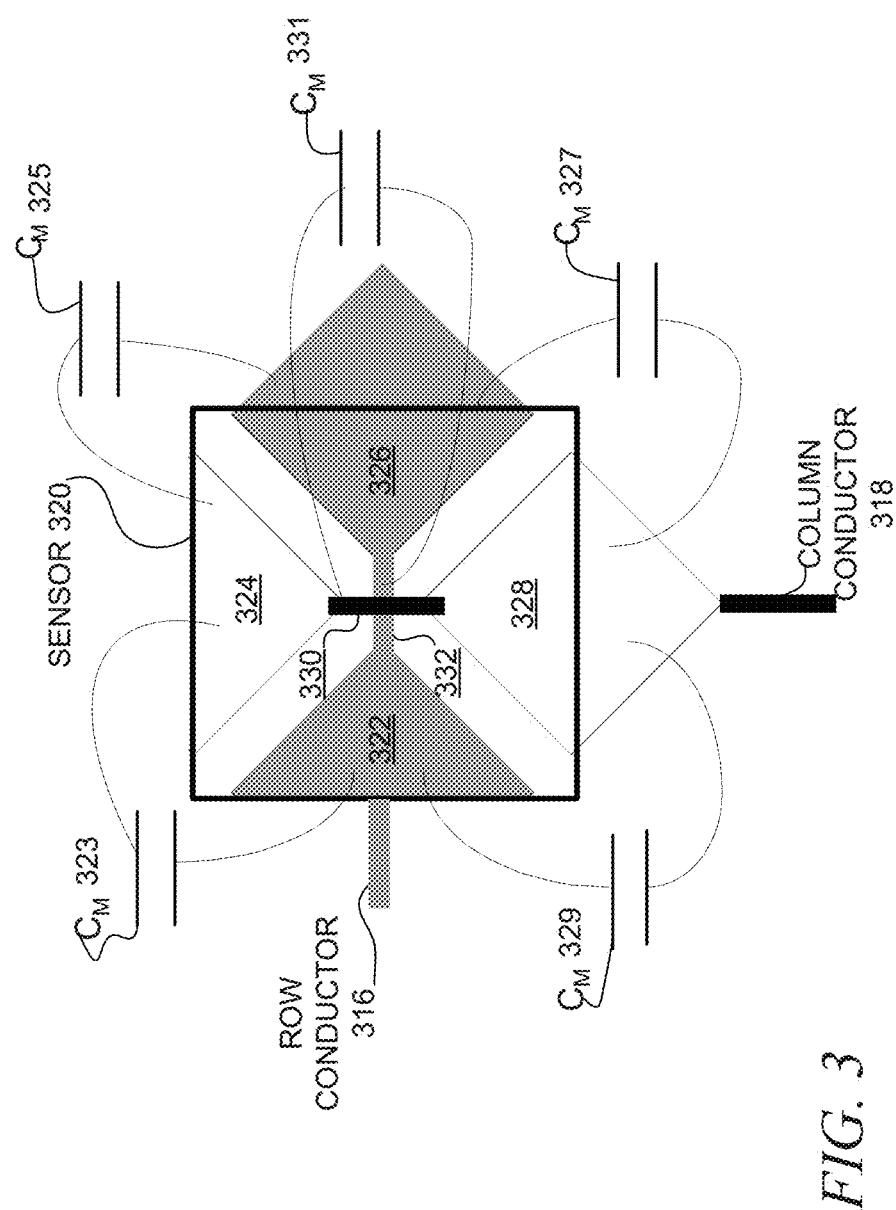
FIG. 3 is a block diagram illustrating a sensor, in accordance with embodiments.

FIG. 3 is a block diagram illustrating a sensor 320, in accordance with embodiments. In the embodiments described herein a sensor may be referred to as a unit cell. A unit cell includes an area where a TX electrode can cause a change in capacitance of an RX electrode and where the resulting capacitance can be measured (e.g., through a sensor signal). The rectangle designated as the sensor 320 shows the boundaries of what is considered to be a unit cell in example embodiments. It will be noted that the sensor 320 may be shaped differently without departing from the claimed subject matter.

The encircled area 210 of FIG. 2 includes the sensor 320 or unit cell. The sensor 320 includes a portion of the electrode in column $C_0$ in FIG. 2 including the sensor elements 324 and 328 connected by the connector element 330. The sensor 320 also includes a portion of the electrode of row $R_7$ in FIG. 2 including the sensor elements 322 and 326 connected by the connector element 332. Although the connector element 330 is shown to cross the connector element 332, the row sensor elements 322 and 326 are in galvanic isolation from the column sensor elements 324 and 328. For example, connector element 330 may be a jumper or bridge over the connector element 332 if the row sensor elements 322 and 326 and the column sensor elements 324 and 328 are formed in a same layer upon a substrate.

In an embodiment, the column electrode (e.g., the electrode of $C_0$ of FIG. 2) is the TX or charge forcing electrode. As this electrode is driven (e.g., through the column conductor 318) high and low relative to the row electrode (e.g., the electrode of row $R_7$ of FIG. 2), which is the RX electrode, charge gets coupled from the column sensor elements 324 and 328 and connector element 330 to the row sensor elements 322 and 326 and connector element 332 causing the mutual capacitances $C_M$ 323, 325, 327, 329, and 331. Where the TX and RX electrodes cross represents a location of the total mutual capacitance, measured through the row conductor 316.

The electrodes 200 of FIG. 2 can include multiple sensors that are similar to the sensor 320. In an embodiment, a matrix of 48 sensors or unit cells is made by the 6 column electrodes (e.g., TX electrodes) and the 8 row electrodes (e.g., RX electrodes). That provides 48 measurable sensors using 14 electrodes, each connected to the sensing module of FIG. 1 (e.g., each electrode may be coupled to a different pin of a touch controller). Within this matrix of sensors, there is no charge transferred between the edges of adjacent sensors along the Y-axis, because each column sensor element is coupled to the adjacent sensor along the Y-axis. Likewise, there is no charge transferred between adjacent sensors along the X-axis because each row sensor element is coupled to the adjacent sensor along the X-axis. As introduced above with respect to FIG. 1, some portions of touch sensor conductors (e.g., traces) may be located within the sensing area 103 and other portions may be located outside of the sensing area 103. Conductor routing is discussed in more detail with respect to FIGS. 4-10.

Figure 4:
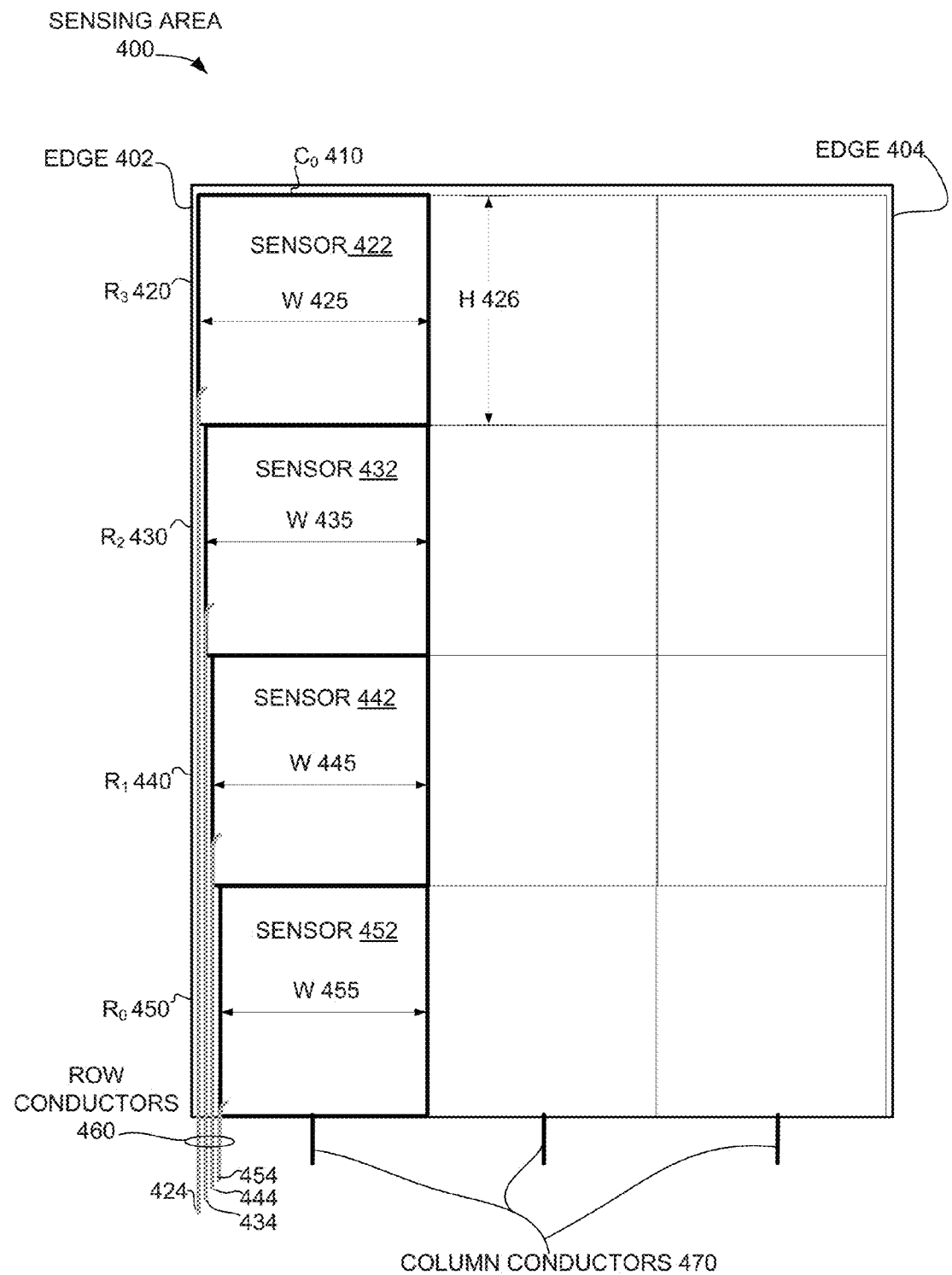
FIG. 4 is a block diagram illustrating conductor routing along an edge of a sensing area having a sensor matrix, in accordance with embodiments.

FIG. 4 is a block diagram illustrating conductor routing along an edge 402 of a sensing area 400 including a sensor matrix, in accordance with embodiments. The sensing area 400 is an example of the sensing area 103 of FIG. 1. The sensing area 400 is shown to include a 4×3 sensor matrix having 12 sensors and portions of row conductors 460. The row conductors 460 couple each row of sensors $R_0$ 450, $R_1$ 440, $R_2$ 430, and $R_3$ 420 to the sensing module of FIG. 1 while the each of the column conductors 470 couples a column of sensors (e.g., $C_0$ 410) to the sensing module of FIG. 1. With respect to FIG. 4, embodiments are described that reduce sensor size to free up space within the sensing area 400 for conductor routing along the edge 402 of the sensing area.

The row conductor 424 is coupled to the sensor 422, the row conductor 434 is coupled to the sensor 432, the row conductor 444 is coupled to the sensor 442, and the row conductor 454 is coupled to the sensor 452. Portions of the row conductors 460 are shown to be routed inside the edge 402 of the sensing area 400. It will be noted that in some embodiments, portions of the row conductors 460 may be routed along the outside of the edge 402 of the sensing area 400 and/or the size of one more sensors 432, 442, and 452 along the edge 402 may not be reduced. In an embodiment, all or a portion of each of the row conductors 460 (e.g., the portion within the sensing area 400) is made of transparent conductive material such as ITO or metal conductor that is so thin that it is not visible to the naked eye of a typical human user (e.g., under typical use conditions). The dimensions of the row conductors 460 and the sensors 425, 435, 445, and 455 are not drawn to actual scale. For example, the width of a row conductor may be 100 to 1000 times smaller than the width of a sensor.

As the number of row conductors increases along the length of the edge 402, the width of the sensors in column $C_0$ 410 gradually decreases to free up space for the conductors in the sensing area 400. For example, when a length or a segment of the row conductor 424 is between the edge 402 and the sensor 432 of row $R_2$ 430, the width W 435 of the sensor 432 is less than the width W 425 of the sensor 422 of row $R_3$ 420. When segments of row conductors 424 and 434 are between the edge 402 and the sensor 442 of row $R_1$ 440, the width W445 of the sensor 442 is less than the width W 435 of the sensor 432 of row $R_2$ 430. When lengths of row conductors 424, 434, and 444 are between the edge 402 and the sensor 452 of row $R_0$ 450, the width W 455 of the sensor 452 is less than the width W445 of the sensor 442 of row $R_1$ 440. In this embodiment, although the widths of the sensors are varied, all of the sensor may have the same height H 426 as the sensor 422 of row $R_3$ 420.

Thus, the sensor matrix is located in the sensing area 400 and the sensor matrix includes a first sensor (e.g., the sensor 422) and a second sensor (e.g., the sensor 432). The sensor 422 is in a first column (e.g., column $C_0$ 410) of sensors and in a first row (e.g., row $R_3$ 420) of sensors of the sensor matrix. The sensor 432 is in the column $C_0$ 410 of sensors and in a second row (e.g., row $R_2$ 420) of sensors of the sensor matrix.

A first conductor (e.g., the row conductor 424) located in the sensing area 400 is coupled to the sensor 422 and is configured to be coupled to the sensing module 106 of FIG. 1. A second conductor (e.g., the row conductor 434) located in the sensing area 400 is coupled to the sensor 432 and configured to be coupled to the sensing module 106. For example, the row conductors 424 and 434 can be coupled with a flexible printed circuit board including a touch controller.

In an embodiment, the sensor 422 consumes a first area (e.g., H 426 times W 425) while the sensor 432 and a length of the row conductor 424 reside within a second area that is smaller than or equal to the first area consumed by the sensor 422. For example, because the area (e.g., H 426 times W 435) of the sensor 432 is smaller than the area (e.g., H 426 times W 425) of the sensor 422, the length of the row conductor 424 routed between the edge 402 and the sensor 432 as well as the sensor 432 itself can fit within an area that is equal in size to the area of the sensor 422.

The areas of additional sensors can be reduced to free up space within the sensing area 400 for conductor routing along the edge 402. For example, the sensor matrix includes a third sensor (e.g., the sensor 442) in the column $C_0$ 410 of sensors and in a third row (e.g. row $R_1$ 440) of sensors. A third conductor (e.g., the row conductor 444) located in the sensing area 400 is coupled to the sensor 442 and is configured to be coupled to the sensing module 106 of FIG. 1.

The reduced width W 445 of the sensor 442 allows the sensor 442, a length of the row conductor 434, and another length of the row conductor 424 to fit and reside within an area that is smaller than or equal to the area consumed by the sensor 422. The lengths of row conductors 424 and 434 are shown to be routed between the edge 402 of the sensing area 400 and the sensor 442. Similarly, additional segments of the row conductors 460 are shown to be routed between the edge 402 and the sensor 452 (e.g., which has the relatively smaller width 445) in row $R_0$ 450.

It will be noted that a similar technique may be used to route column conductors along a top or bottom edge of the sensing area. For example, routing column conductors along a top edge can be visualized by rotating the sensing area 400 90 degrees clockwise. In this case, the row conductors 460 would become column conductors and the column conductors 470 would become row conductors.

Embodiments describe the routing of conductors between the edge 402 of the sensing area 400 and sensors instead of routing the conductors between adjacent columns, between adjacent rows, or outside of the sensing area 400. Edge routing can result in improved touch resolution compared to the touch resolution observed when sensors are spaced apart by routing channels running between them. The use of opaque borders (e.g., bezels) to conceal routing outside of the edges of the sensing area can be avoided when the row conductors 460 are routed within the edge 402 of the sensing area 400. Without bezels bordering the edges of the sensing area the display area (e.g., the display area 105 of FIG. 1) can span from edge 402 to edge 404, which can improve user experience in some use cases.

As the size of the sensors decreases along the column $C_0$ 410, the presence and position resolution can decrease, however, the decrease can be predicted and the sensing module 106 of FIG. 1 can compensate for this through various correction algorithms. This decrease in resolution near the edge 402 may be less noticeable to a user compared to such a decrease in resolution near the middle of the sensing area 400 where sensor density (e.g., number of sensors affected by a touch) is greater than sensor density on the edge 402.

The column conductors 470 and the row conductors 460 may be coupled to the sensing module of FIG. 1 (e.g., a touch controller). For example, the row conductors 460 and the column conductors 470 may extend from the sensing area 400 via respective silver traces. The silver traces may be bonded to copper traces of a flex connector which may be coupled directly to the touch controller or through a printed circuit board coupled to the touch controller. The fan out of the routing readily allows row conductors 460 and column conductors 470 to be grouped together for connection to the touch controller. Keeping the row conductors and the column conductors separately grouped can minimize interference to RX signals (e.g., sensor signals) due to TX signals. Examples of how the sensors of FIG. 4 may be implemented are discussed with respect to FIGS. 5 and 6.

Figure 5:
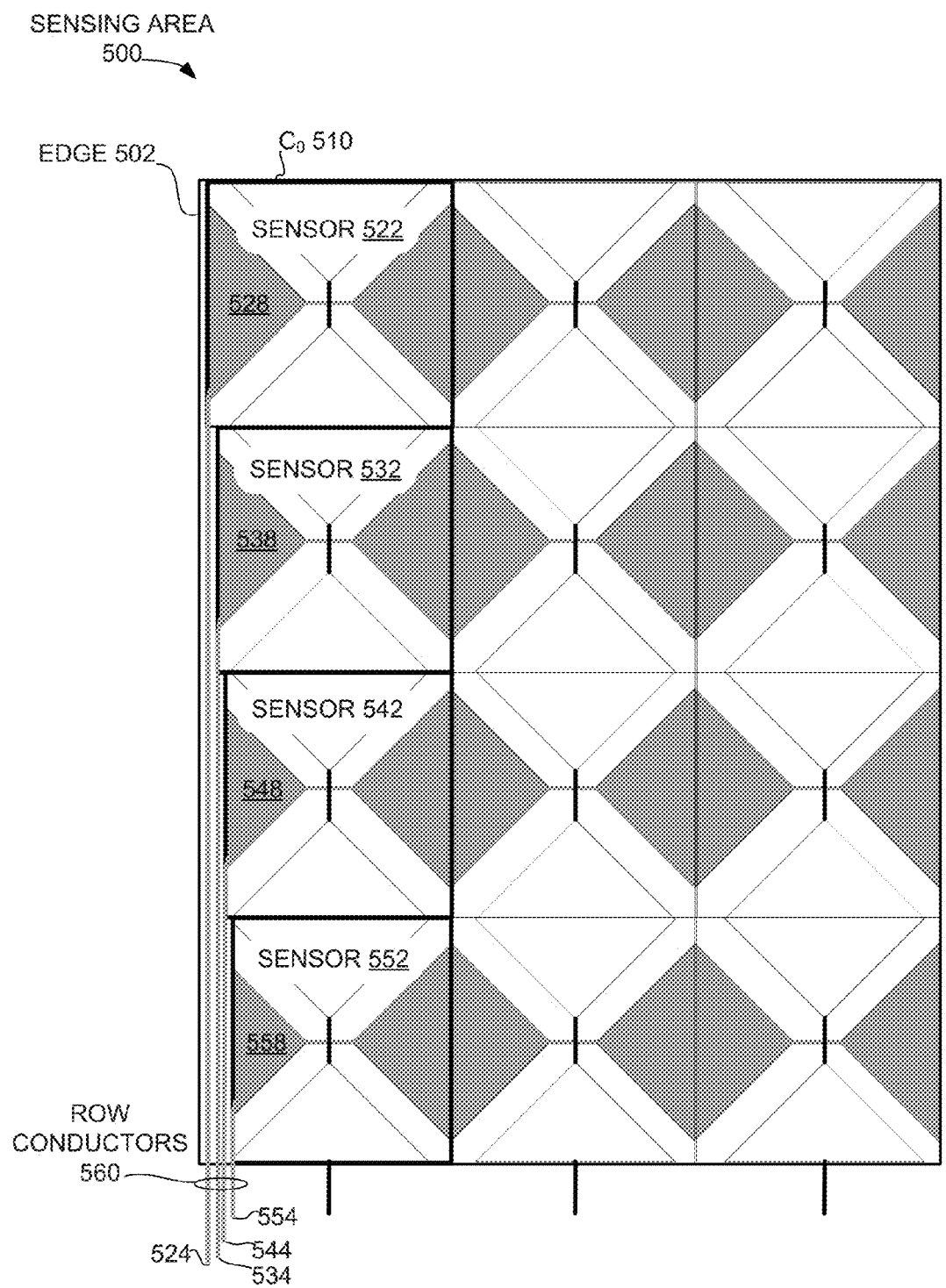
FIG. 5 is a block diagram illustrating conductor routing along an edge of a sensing area having a sensor matrix with half-diamond shaped sensor elements, in accordance with an embodiment.

FIG. 5 is a block diagram illustrating conductor routing along an edge 502 of a sensing area 500 having a sensor matrix with half-diamond shaped sensor elements, in accordance with an embodiment. The sensing area 500 of FIG. 5 is an example of the sensing area 400 of FIG. 4 and also illustrates reduced size sensors to make space within the sensing area 500 for conductor routing along the edge 502 of the sensing area 500. The multiple rows of electrodes of the sensing area 500 are in galvanic isolation from the multiple columns of electrodes. Each sensor of the sensor matrix is measured for capacitance as explained for the sensor 320 of FIG. 3. Thus, each sensor includes a crossing of one of the row electrodes with one of the column electrodes.

In an embodiment, the rows of electrodes, the row conductors (e.g., the portions of row conductors located within the sensing area), and the columns of electrodes are formed of a transparent conductive material (e.g., ITO) in a layer upon a substrate. As described with respect to FIG. 3, the rows of diamonds may be connected using bridges in the same ITO layer and the columns of diamonds may be connected using a metal bridge that goes over top of the row bridge. In other embodiments, the rows may be connected with metal bridges and the columns with ITO bridges. Alternatively or additionally the row electrodes and column electrodes may be implemented in more than one layer upon a substrate.

In an embodiment, the sensors 522, 532, 542, and 552 of FIG. 5 have the same height and widths as the sensors 422, 432, 442, and 452, respectively, of FIG. 4. In FIG. 5, the row conductor 524 is coupled to the sensor element 528 of the sensor 522, the row conductor 534 is coupled to the sensor element 538 of the sensor 532, the row conductor 544 is coupled to the sensor element 548 of the sensor 542, and the row conductor 554 is coupled to the sensor element 558 of the sensor 552. The row conductors 560 are routed inside the edge 502 of the sensing area 500. As the number of row conductors increases along the length of the edge 502, the width of sensors in column $C_0$ 510 gradually decreases to free up space for the row conductors in the sensing area 500.

For example, when a segment of the row conductor 524 is routed between the edge 502 and the sensor 532, the width of the sensor 532 is less than the width of the sensor 522. This reduction in width is due to the smaller size of the sensor element 538 relative to the size of the sensor element 528. When segments of the row conductors 524 and 534 are routed between the edge 502 and the sensor 542, the width of the sensor 542 is less than the width of the sensor 532. This reduction in width is due to the smaller size of the sensor element 548 relative to the size of the sensor element 538. When segments of the row conductors 524, 534, and 544 are routed between the edge 502 and the sensor 552, the width of the sensor 552 is less than the width of the sensor 542. This reduction in width is due to the smaller size of the sensor element 558 relative to the size of the sensor element 548. Thus, sensor size is reduced to make space available within the sensing area 500 for conductor routing along the edge 503 of the sensing area 500. Alternatively or additionally, sensor size can be reduced by reducing the area of one or more other sensor elements of a sensor.

Figure 6:
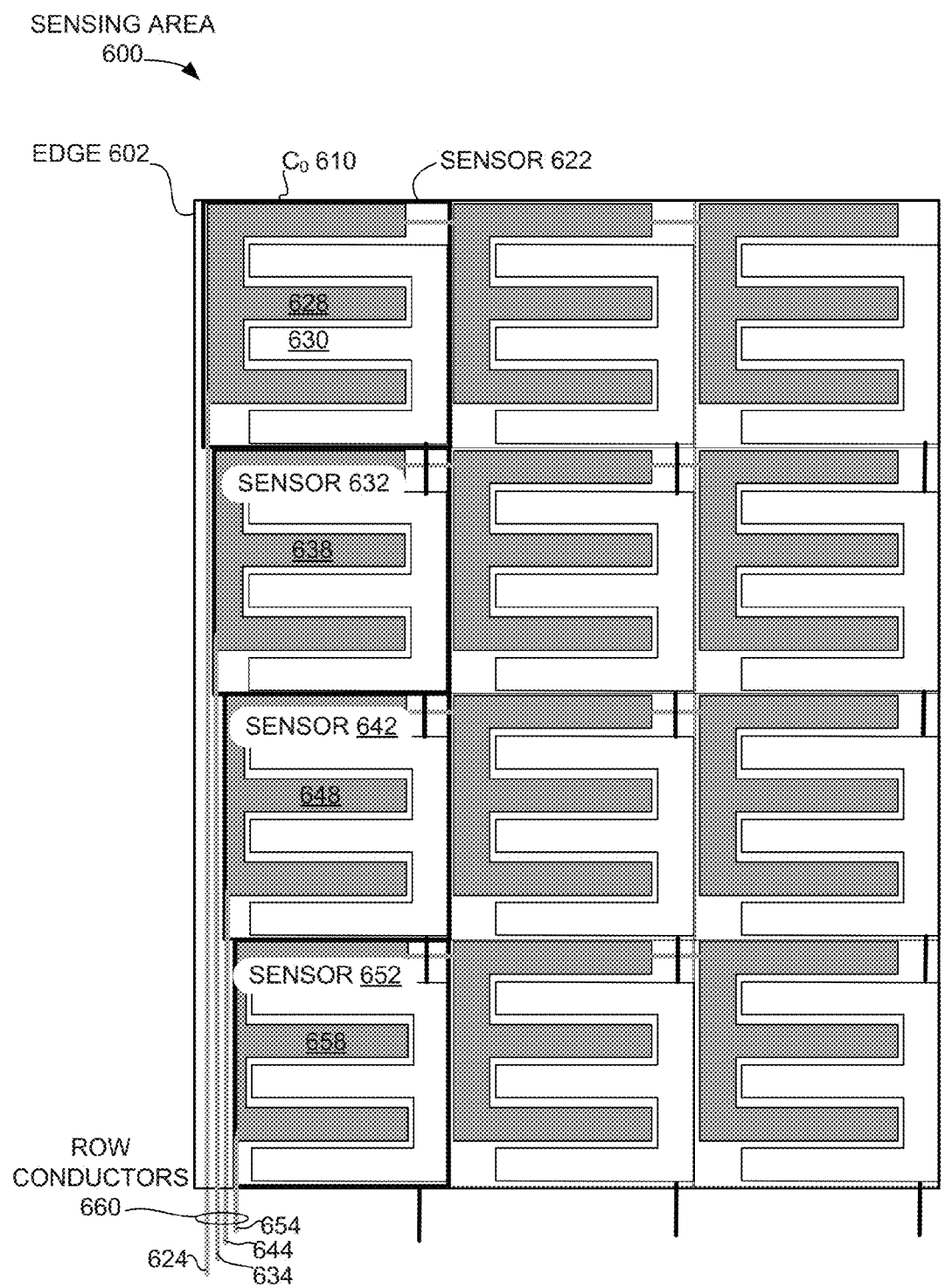
FIG. 6 is a block diagram illustrating conductor routing along an edge of a sensing area having a sensor matrix with "E" shaped sensor elements, in accordance with an embodiment.

FIG. 6 is a block diagram illustrating conductor routing along an edge 602 of a sensing area 600 having a sensor matrix with "E" shaped sensor elements, in accordance with an embodiment. The sensing area 600 of FIG. 6 is another example of the sensing area 400 of FIG. 4 and also illustrates reduced size sensors to free up space within the sensing area 600 for conductor routing along the edge 602 of the sensing area 600.

The row electrodes include "E" shaped sensor elements such as the sensor element 628. The column electrodes include backward "E" shaped sensor elements such as the sensor element 630. The multiple rows of electrodes of the sensing area 600 are in galvanic isolation from the multiple columns of electrodes. Each sensor or unit cell includes a row sensor element and column sensor element. For example, the sensor 622 includes the sensor elements 628 and 630.

Similar to the sensor 320 described above with respect to FIG. 3, each sensor of the sensor matrix is measured for mutual capacitance of its sensor elements. In an embodiment, the rows of electrodes, the row conductors 660 (e.g., the portion of each of the row conductors 660 located within the sensing area 600), and the columns of electrodes are formed of a transparent conductive material (e.g., ITO) in a layer upon a substrate. As described with respect to FIG. 3, the sensor elements of each row electrode may be connected using bridges in the same ITO layer and the columns of sensor elements may be connected using a metal bridge that goes over the top of the row bridge. In other embodiments, the sensor elements of each row electrode may be connected with metal bridges and the sensor elements of each column electrode may be connected with ITO bridges. Alternatively or additionally the row electrodes and column electrodes may be formed in more than one layers of transparent material upon a substrate.

In an embodiment, the sensors 622, 632, 642, and 652 of FIG. 6 have the same height and widths as the sensors 422, 432, 442, and 42, respectively, of FIG. 4. In FIG. 6, the row conductor 624 is coupled to the sensor element 628 of the sensor 622, the row conductor 634 is coupled to the sensor element 638 of the sensor 632, the row conductor 644 is coupled to the sensor element 648 of the sensor 642, and the row conductor 654 is coupled to the sensor element 658 of the sensor 652. The row conductors 660 are routed inside the edge 602 of the sensing area 600. As the number of row conductors increases along the length of the edge 602, the width of sensors in column $C_0$ 610 gradually decreases to free up space for the row conductors in the sensing area 600.

For example, when the row conductor 624 is routed between the edge 602 and the sensor 632, the width of the sensor 632 is less than the width of the sensor 622. This reduction in width is due to the smaller size of the sensor element 638 relative to the size of the sensor element 628. When the row conductors 624 and 634 are routed between the edge 602 and the sensor 642, the width of the sensor 642 is less than the width of the sensor 632. This reduction in width is due to the smaller size of the sensor element 648 relative to the size of the sensor element 638. When the row conductors 624, 634, and 644 are routed between the edge 602 and the sensor 652, the width of the sensor 652 is less than the width of the sensor 642. This reduction in width is due to the smaller size of the sensor element 658 relative to the size of the sensor element 648.

Thus, sensor size is reduced to make space available within the sensing area 600 for conductor routing along the edge 602. Alternatively or additionally, sensor size can be reduced by reducing the area of one or more other sensor elements of a sensor. Embodiments that provide space within a sensing area for conductor routing along multiple edges of the sensing area are discussed below with respect to FIGS. 7-10.

Figure 7:
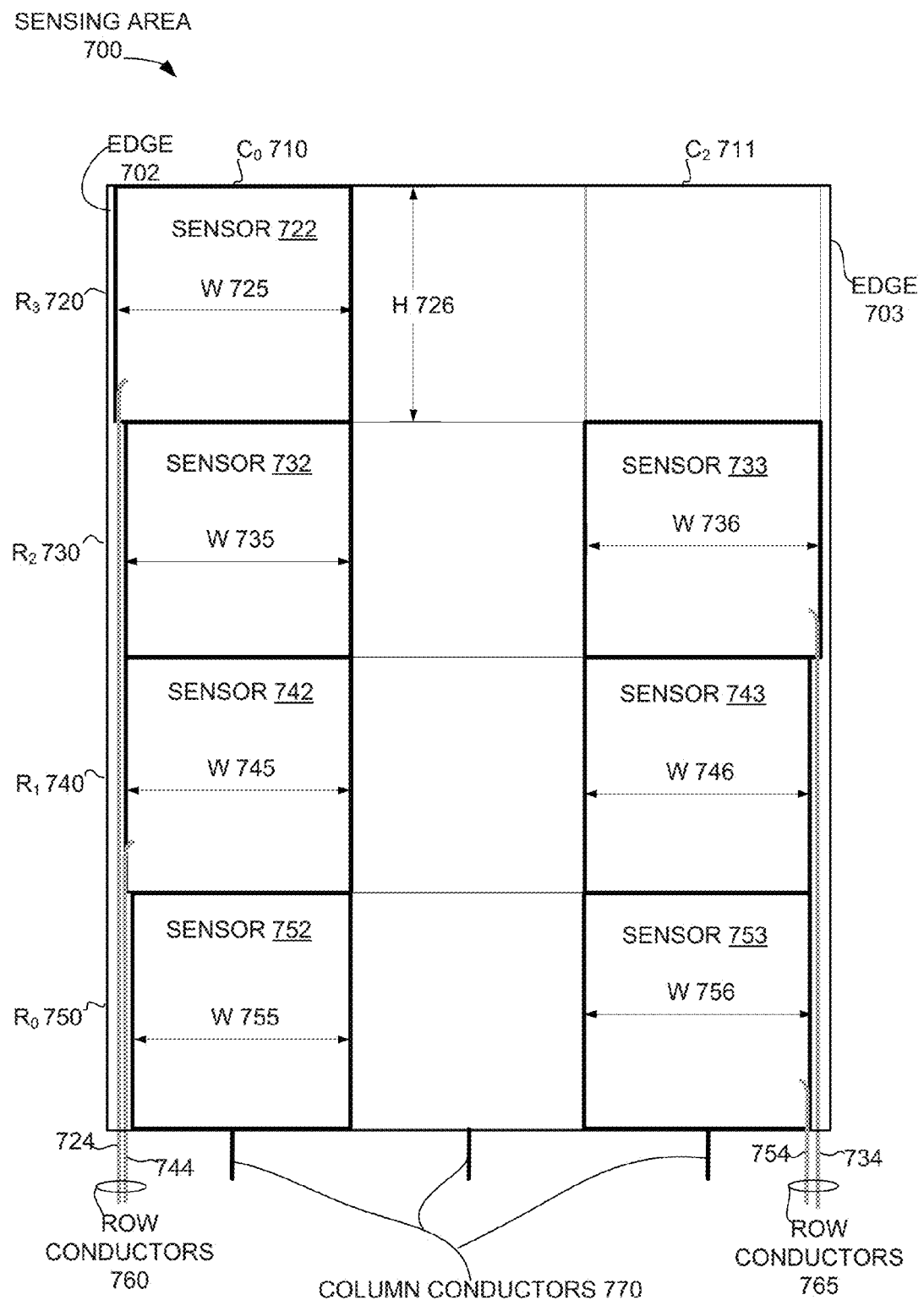
FIG. 7 is a block diagram illustrating conductor routing along multiple edges of the sensing area having a sensor matrix, in accordance with an embodiment.

FIG. 7 is a block diagram illustrating conductor routing along multiple edges 702 and 703 of a sensing area 700 having a sensor matrix, in accordance with an embodiment. In an embodiment, the sensing area 700 is an example of the sensing area 103 of FIG. 1. The sensing area 700 is shown to include row conductors 760 and 765 and a 4×3 sensor matrix having 12 sensors to be scanned by the sensing module of FIG. 1. The row conductors 760 and 765 couple each row of sensors $R_0$ 750, $R_1$ 740, $R_2$ 730, and $R_3$ 720 to the sensing module 106 of FIG. 1 while each of the column conductors 770 couple a column of sensors to the sensing module 106 of FIG. 1.

With respect to FIG. 7, embodiments are described that reduce sensor size to make space within the sensing area 700 for conductor routing along the edges 702 and 703. The row conductor 724 is coupled to the sensor 722, the row conductor 734 is coupled to the sensor 733, the row conductor 744 is coupled to the sensor 742, and the row conductor 754 is coupled to the sensor 753. The row conductors 760 are routed inside the edge 702 and the row conductors 765 are routed inside the edge 703. It will be noted that in some embodiments, portions of the row conductors 760 and 765 may be routed along the outside of the edges 702 and 703 of the sensing area 700 and/or the sizes of one or more sensors 732, 742, and 752, and 733, 743, and 753, along the edges 702 and 703, respectively, may not be reduced. As the number of row conductors increases along the length of the edge 702, the width of sensors in column $C_0$ 710 gradually decreases to free up space for the row conductors 724 and 744 to be routed along the edge 702. Likewise, the width of sensors in column $C_2$ 711 decreases to free up space for the row conductor 734.

For example, with respect to the edge 702, when a segment or length of the row conductor 724 is routed between the edge 702 and the sensors 732 and 742, the width W 735 of the sensors 732 and 742 is less than the width W 725 of the sensor 722. When segments or lengths of the row conductors 724 and 744 are routed between the edge 702 and the sensor 752, the width W 755 of the sensor 752 is less than the width W 745 of the sensor 742. With respect to the edge 703, when a segment of the row conductor 734 is between the edge 703 and the sensors 743 and 753, the widths W 746 and W 756 of the sensors 743 and 753, respectively, are less than the width W 733 of the sensor 733. In this embodiment, although the widths of the sensors are varied, all of the sensors may have the same height H 726 as the sensor 722.

Thus, the sensor matrix is located in the sensing area 700 and the sensor matrix includes a first sensor (e.g., the sensor 722) and a second sensor (e.g., the sensor 732). The sensor 722 is in a first column (e.g., column $C_0$ 710) of sensors and in a first row (e.g., row $R_3$ 730) of sensors. The sensor 732 is in the column $C_0$ 710 of sensors and in a second row (e.g., row $R_2$ 730) of sensors.

A first conductor (e.g., the row conductor 724) located in the sensing area 700 is coupled to the sensor 722 and is configured to be coupled to the sensing module 106 of FIG. 1. A second conductor (e.g., the row conductor 744) located in the sensing area 700 is coupled to the sensor 742 and configured to be coupled to the sensing module 106. For example, the row conductors 724 and 744 can be coupled with a flexible printed circuit board including a touch controller.

In an embodiment, the sensor 722 consumes a first area (e.g., H 726 times W 725) while the sensor 742 and a segment of the conductor 724 reside within a second area that is smaller than or equal to the first area consumed by the sensor 722. For example, because the area (e.g., H 726 times W 745) of the sensor 742 is smaller than the area (e.g., H 726 times W 725) of the sensor 722, the segment of the row conductor 724 (e.g., the length routed between the edge 702 and the sensor 742) as well as the sensor 742 itself can fit within an area that is equal in size to the area of the sensor 722.

The areas of additional sensors can be reduced to make space within the sensing area 700 for conductor routing along the edge 703. For example, the sensor matrix includes a third sensor (e.g., the sensor 733) in a second column of sensors (e.g., the column $C_2$ 711) and in a third row (e.g. row $R_2$ 730) of sensors. The sensor matrix further includes a fourth sensor (e.g., the sensor 753) in column $C_2$ 711 and in a fourth row of sensors (e.g., row $R_0$ 750). A third conductor (e.g., the row conductor 734) located in the sensing area 700 is coupled to the sensor 733 and is configured to be coupled to the sensing module 106. A fourth conductor (e.g., the row conductor 754) located in the sensing area 700 is coupled to the sensor 753 and is configured to be coupled to the sensing module 106.

In an embodiment, the sensor 733 consumes a first area (e.g., H 726 times W 736) while the sensor 753 and a segment of the row conductor 734 reside within a second area that is smaller than or equal to the first area consumed by the sensor 733. For example, because the area (e.g., H 726 times W 756) of the sensor 753 is smaller than the area (e.g., H 726 times W 736) of the sensor 733, the length of the row conductor 734 (e.g., the length routed between the edge 703 and the sensor 753) as well as the sensor 753 itself can fit within an area that is equal in size to the area of the sensor 733.

In the fashion described above, sensor sizes are reduced to free up space within the sensing area 700 for conductor routing along the edges 702 and 703. In embodiments where conductors are routed along two edges rather than one, sensors require relatively less reduction in size. As a result, the reduced size sensors of FIG. 7 can be larger than the reduced size sensors of FIG. 4 while still being connected via row conductors to the sensing module. In an embodiment relatively larger sensors of FIG. 7 provide better presence and position resolution on the edges than the relatively smaller sensors of FIG. 4.

It will be noted that a similar technique may be used to route column conductors along a top or bottom edge of the sensing area. For example, routing column conductors along a top edge can be visualized by rotating the sensing area 700 90 degrees clockwise. In this case, the row conductors would be column conductors and the column conductors would be row conductors.

Figure 8:
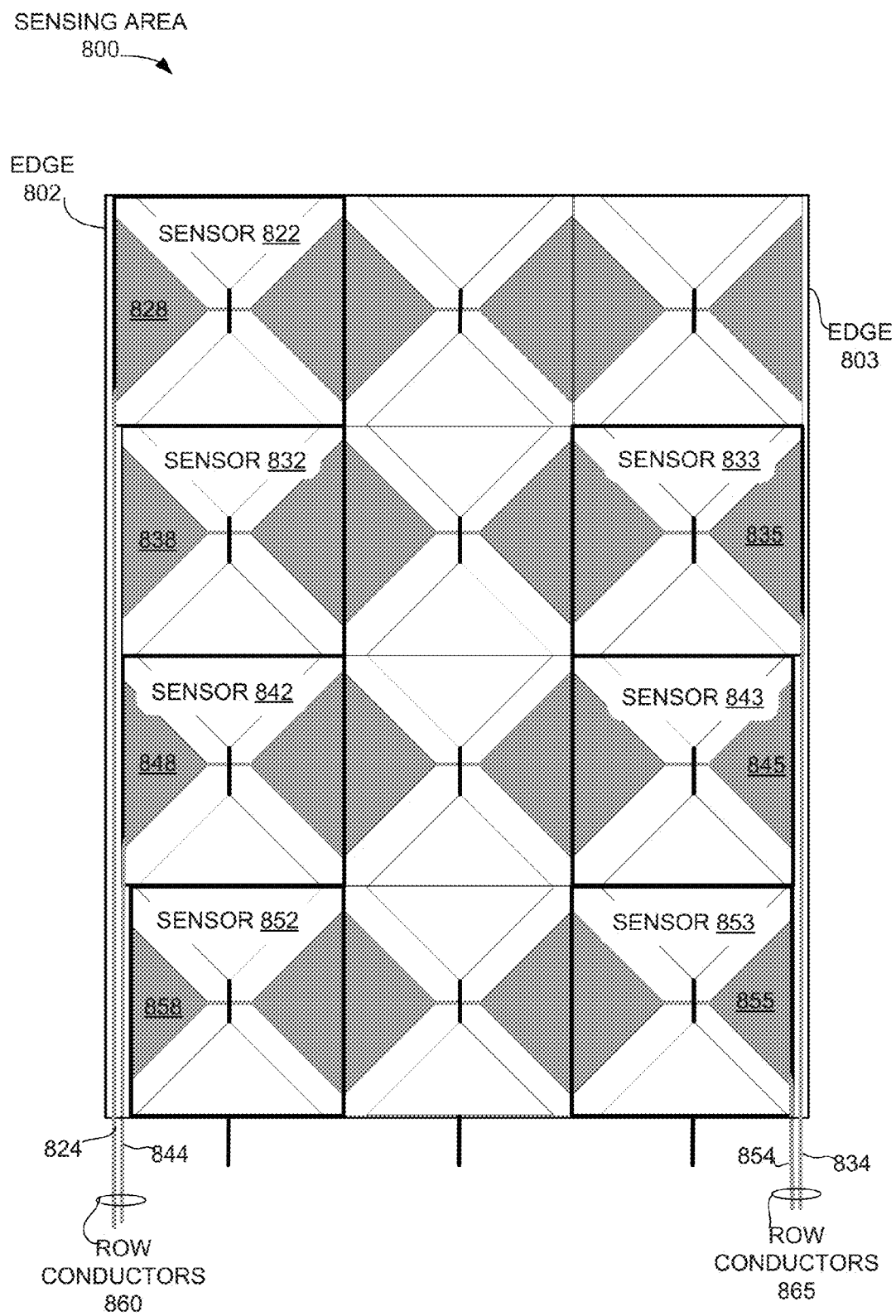
FIG. 8 is a block diagram illustrating conductor routing along multiple edges of a sensing area having a sensor matrix with half-diamond shaped sensor elements, in accordance with an embodiment.

FIG. 8 is a block diagram illustrating conductor routing along multiple edges 802 and 803 of a sensing area 800 having a sensor matrix with half-diamond shaped sensor elements, in accordance with an embodiment. The sensing area 800 of FIG. 8 is an example of the sensing area 700 of FIG. 7 and also illustrates reduced size sensors to open up space within the sensing area 800 for conductor routing along the edges 802 and 803.

In an embodiment, the sensors 822, 832, 833, 842, 843, 852, and 853 of FIG. 8 have the same height and width as the sensors 722, 732, 733, 742, 743, 752, and 753, respectively, of FIG. 7. In FIG. 8, the row conductor 824 is coupled to the sensor element 828 of the sensor 822, the row conductor 844 is coupled to the sensor element 848 of the sensor 842, the row conductor 834 is coupled to the sensor element 835 of the sensor 833, and the row conductor 854 is coupled to the sensor element 855 of the sensor 853. The row conductors 860 are shown to be routed inside the edge 802 and the row conductors 865 are shown to be routed inside the edge 803.

For example, with respect to the edge 802, when a segment or length of the row conductor 824 is routed between the edge 802 and the sensors 832 and 842 the widths of the sensors 832 and 842 are less than the width of the sensor 822. This reduction in width is due to the smaller size of the sensor elements 838 and 848 relative to the size of the sensor element 828. When segments or lengths of the row conductors 824 and 844 are routed between the edge 802 and the sensor 852, the width of the sensor 852 is less than the width of the sensor 842. This reduction in width is due to the smaller size of the sensor element 858 relative to the size of the sensor element 848.

With respect to the edge 803, when a segment of the row conductor 834 is routed between the edge 803 and the sensors 843 and 853, the widths of the sensors 843 and 853 are less than the width of the sensor 833. This reduction in width is due to the smaller size of the sensor elements 845 and 855 relative to the size of the sensor element 835. Thus, sensor size is reduced to make space within the sensing area 800 for conductor routing along the edges 802 and 803. Alternatively or additionally, sensor size can be made smaller by reducing the area of more than one sensor element of a sensor.

Figure 9:
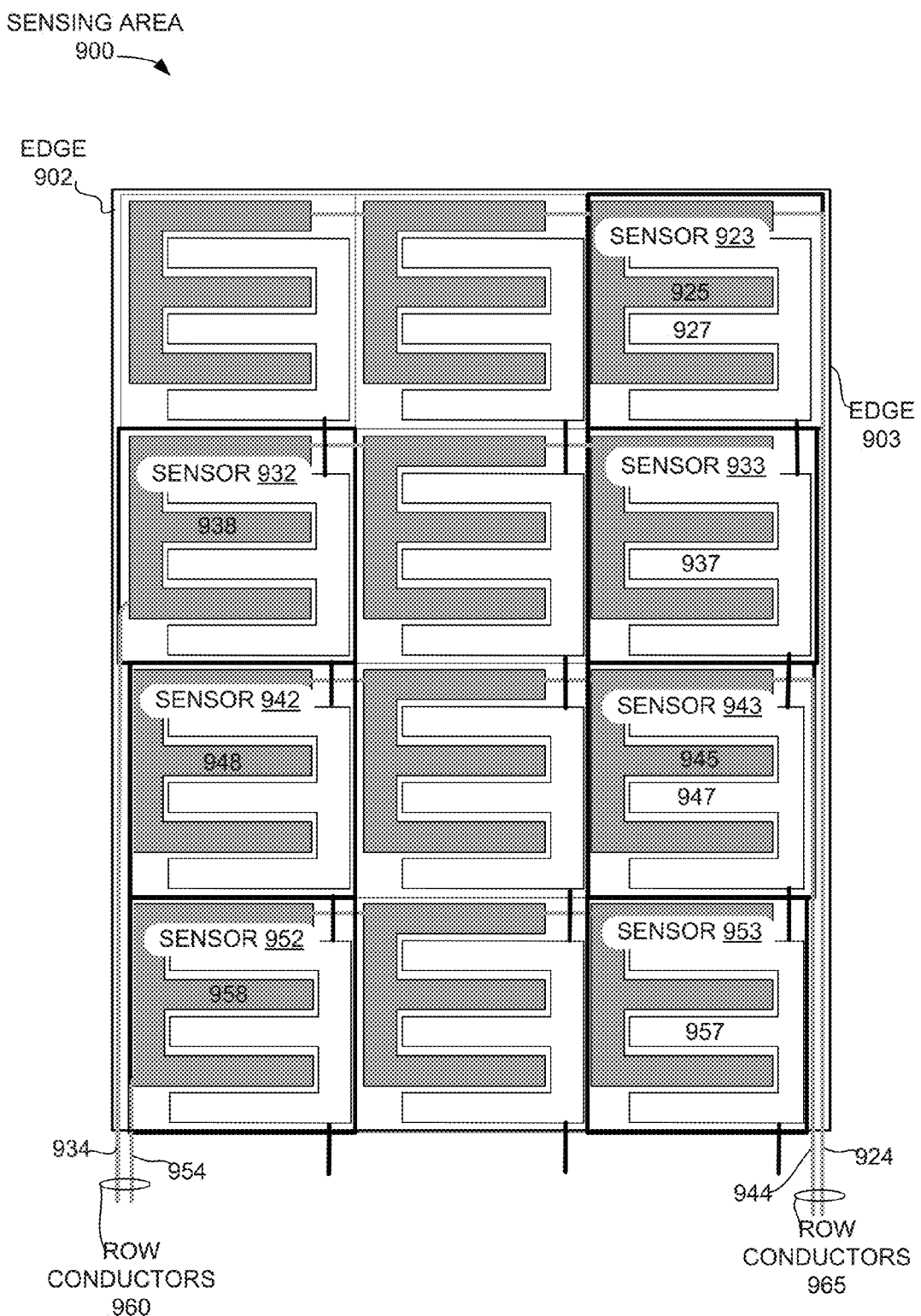
FIG. 9 is a block diagram illustrating conductor routing along multiple edges of a sensing area having a sensor matrix with "E" shaped sensor elements, in accordance with an embodiment.

FIG. 9 is a block diagram illustrating conductor routing along multiple edges 902 and 903 of a sensing area 900 having a sensor matrix with "E" shaped sensor elements, in accordance with an embodiment. The sensing area 900 of FIG. 9, like the sensing area 700 of FIG. 7, illustrates reduced size sensors to open up space for conductor routing along two edges of a sensing area.

In FIG. 9, the row conductor 924 is coupled to the sensor element 925 of the sensor 923, the row conductor 944 is coupled to the sensor element 945 of the sensor 943, the row conductor 934 is coupled to the sensor element 938 of the sensor 932, and the row conductor 954 is coupled to the sensor element 958 of the sensor 952. The row conductors 965 are shown to be routed inside the edge 903 and the row conductors 960 are shown to be routed inside the edge 902.

For example, with respect to the edge 903, when a segment or length of the row conductor 924 is routed between the edge 903 and the sensor 933, the width of the sensor 933 is less than the width of the sensor 923. This reduction in width is due to the smaller size of the sensor element 937 relative to the size of the sensor element 927. When segments or lengths of the row conductors 924 and 944 are routed between the edge 903 and the sensor 953, the width of the sensor 953 is less than the width of the sensor 943. This reduction in width is due to smaller size of the sensor element 957 relative to the size of the sensor element 947.

With respect to the edge 902, when a segment of the row conductor 934 is routed between the edge 902 and the sensors 942 and 952, the widths of the sensor 942 and 952 are less than the width of the sensor 932. These reductions in width are due to the smaller sizes of the sensor element 948 and 958 relative to the size of the sensor element 938. Thus, sensor size is reduced to make space within the sensing area for conductor routing along the edges 902 and 903 of the sensing area 900. Alternatively or additionally, sensor size can be reduced by reducing the area of more than one sensor element of a sensor.

Figure 10:
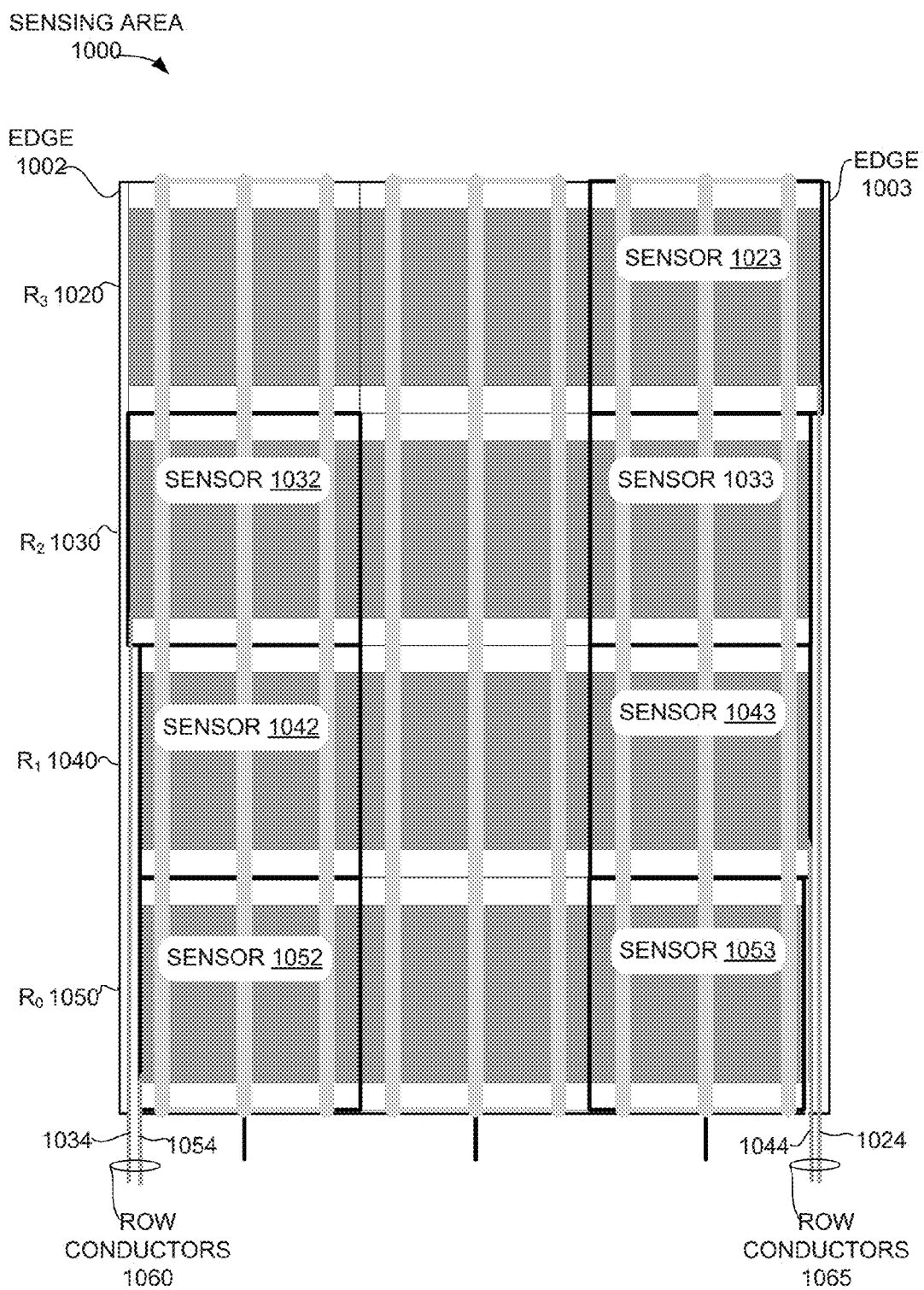
FIG. 10 is a block diagram illustrating conductor routing along multiple edges of a sensing area having a sensor matrix with bar shaped electrodes and fork shaped electrodes, in accordance with an example embodiment.

FIG. 10 is a block diagram illustrating conductor routing 1000 along multiple edges 1002 and 1003 of a sensing area 1000 having a sensor matrix with bar shaped electrodes and fork shaped electrodes, in accordance with an example embodiment. The sensing area 1000 of FIG. 10, like FIG. 7, illustrates reduced size sensors to free up space for conductor routing along two edges of a sensing area.

The row electrodes are bar shaped and the column electrodes are prong shaped. The multiple rows of electrodes are in galvanic isolation from the multiple columns of electrodes. Similar to the unit cell described above with respect to FIG. 3, each sensor of the sensor matrix is measured for mutual capacitance between a row electrode and a column electrode. In this embodiment, the rows of electrodes $R_0$ 1050, $R_1$ 1040, $R_2$ 1030, and $R_3$ 1020 and the row conductors 1060 and 1065 (e.g., the row conductors located within the sensing area) are formed of transparent conductive material in one layer upon a substrate and the columns of electrodes are formed of transparent conductive material in another layer upon the substrate.

In FIG. 10, the row conductor 1024 is coupled to the sensor 1023, the row conductor 1034 is coupled to the sensor 1032, the row conductor 1044 is coupled to the sensor 1043, and the row conductor 1054 is coupled to the sensor 1052. The row conductors 1065 are shown to be routed inside the edge 1003 and the row conductors 1060 are shown to be routed inside the edge 1002.

For example, with respect to the edge 1003, when a segment or length of the row conductor 1024 is routed between the edge 1003 and the sensors 1033 and 1043, the widths of the sensors 1033 and 1043 are less than the width of the sensor 1023. This reduction in width is due to the size reduction of the portion of the row electrodes within the sensors 1033 and 1043 relative to the portion of the row electrode within the sensor 1023. When segments or lengths of the row conductors 1024 and 1044 are routed between the edge 1003 and the sensor 1053, the width of the sensor 1053 is less than the width of the sensor 1043. This reduction in width is due to the size reduction of the portion of row electrode within the sensor 1053 relative to the portion of row electrode within the sensor 1043.

With respect to the edge 1002, when a segment of the row conductor 1034 is routed between the edge 1002 and the sensors 1042 and 1052, the widths of the sensors 1042 and 1052 are less than the width of the sensor 1032. This reduction in width is due to the size reduction of the portion of row electrode within the sensors 1042 and 1052 relative to the portion of row electrode within the sensor 1032. Thus, sensor size is reduced to make space within the sensing area for conductor routing along the edges of the sensing area.

In an embodiment, the row electrodes are TX electrodes and the column electrodes are RX electrodes. At some TX frequencies, alternating the side that the charge comes from as in FIG. 10 may cause a mismatch in the uniformity of charge from sensor to sensor. In another embodiment, routing the bottom half of the sensors on one side and the top half of sensors on the other side can improve uniformity of charge from sensor to sensor at these TX frequencies.

Figure 11:
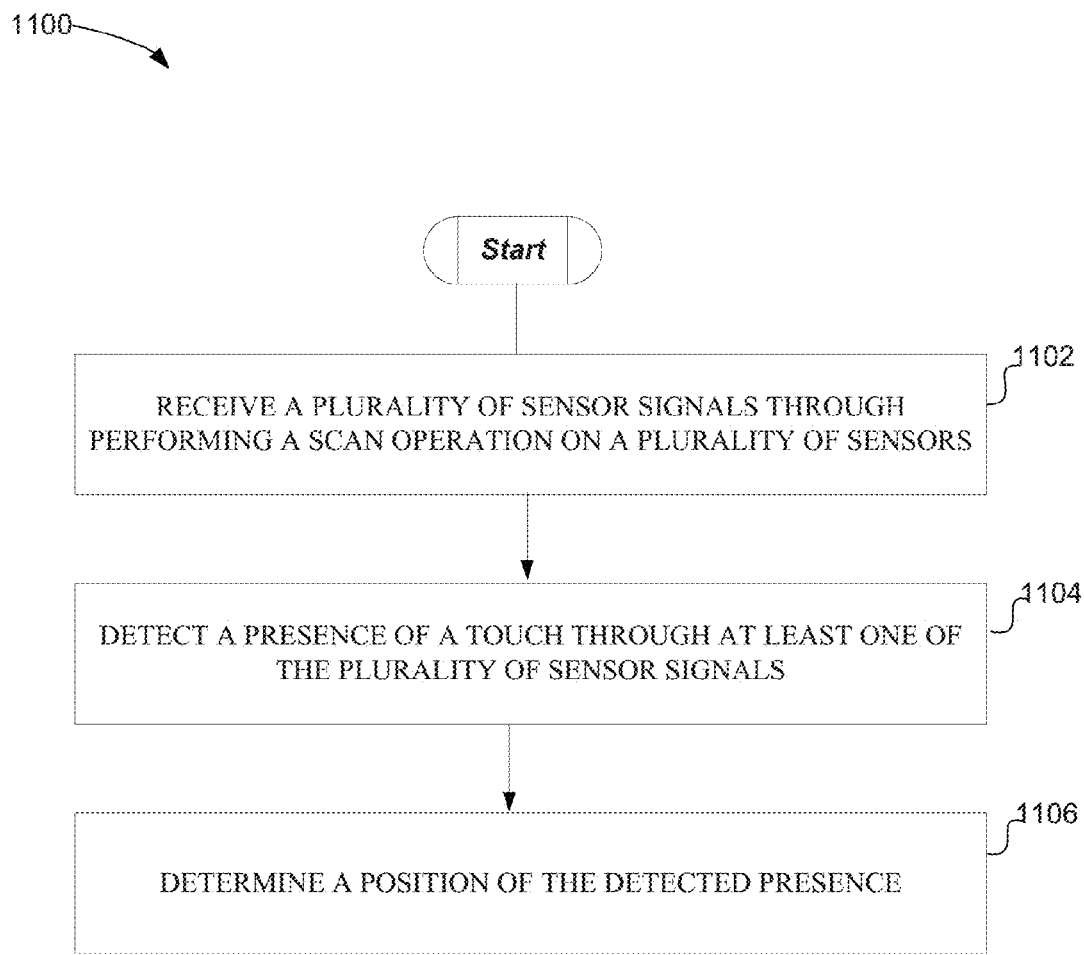
FIG. 11 is a flow diagram illustrating a method for detecting a touch, in accordance with an embodiment.

FIG. 11 is a flow diagram illustrating a method 1100 for detecting a touch, in accordance with an embodiment. A description of the method 1100 refers to components of drawings referred to above for the purpose of explanation and not to limit the claimed subject matter. It will be noted that the methods described herein may be performed by hardware, software, firmware, state machines, or a combination thereof.

At block 1102, the method 1100 includes receiving a plurality of sensor signals through performing a scan operation on a plurality of sensors. For example, the scan operation may include the scan module 150 of FIG. 1 exciting the sensors in the sensing area 700 of FIG. 7 through the column conductors 770 and receiving the sensor signals through the row conductors 760 and 765. Alternatively or additionally the scan module 170 of FIG. 1 may perform axial scan operations as discussed above with respect to FIG. 2.

At block 1104, the method 1100 includes detecting a presence of a touch through at least one of the plurality of sensor signals. The presence module 160 of FIG. 1 may detect a touch proximate to a sensor if one or more sensor signals associated with that sensor correspond to a touch value (e.g., a digital representation of a sensor signal) that meets or exceed a touch threshold value associated with the sensor.

At block 1106, the method 1100 includes determining a position of the detected presence. For example, the position module 170 of FIG. 1 may determine the position of a touch based on the known coordinates of each sensor and a touch value associated with each sensor. In some embodiments, the position module 170 can use a centroid algorithm to determine position of a touch between sensors.

Figure 12:
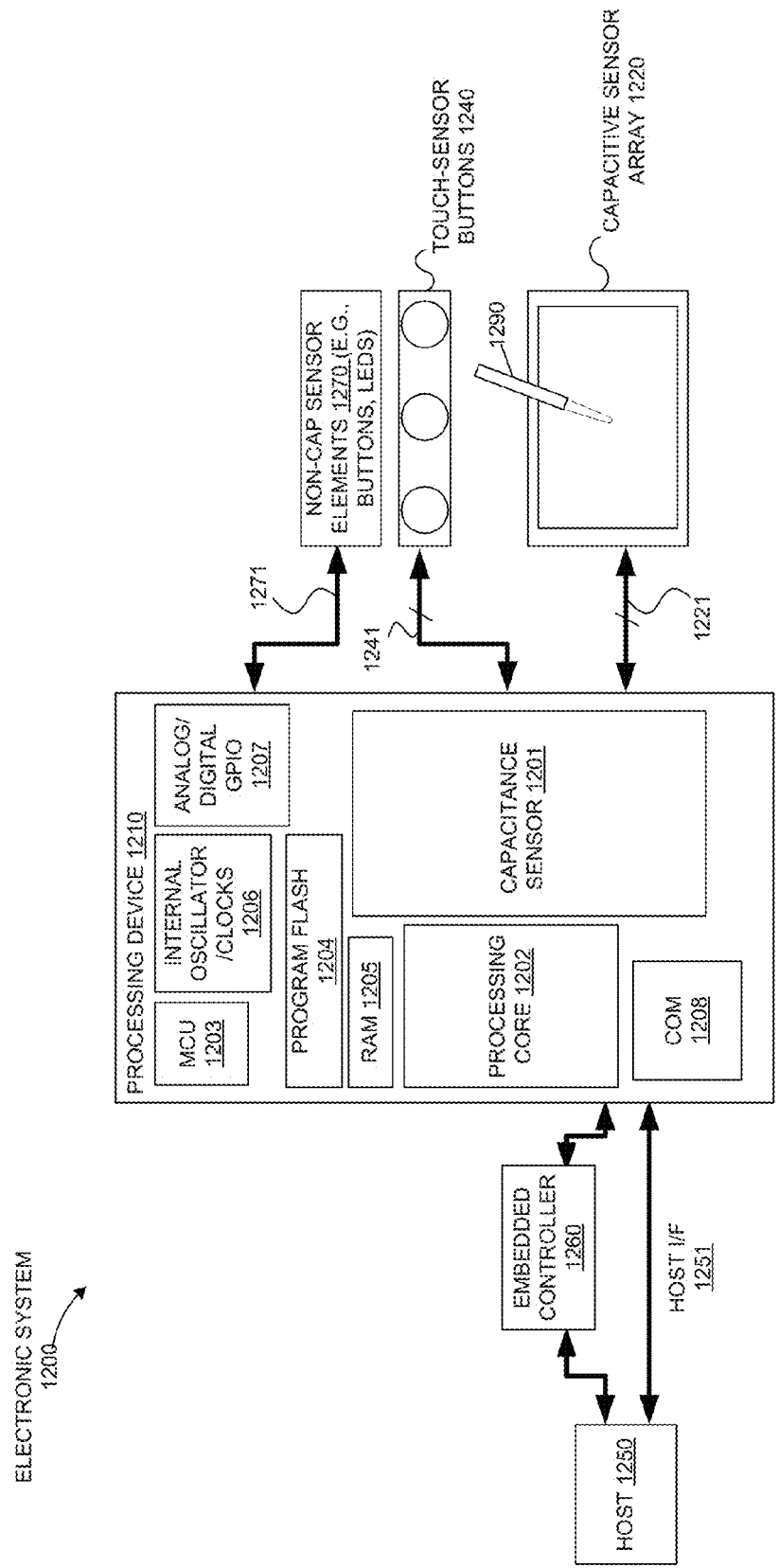
FIG. 12 is a block diagram illustrating an electronic system to detect a presence of a conductive object on a capacitive sensor array, in accordance with various embodiments.

FIG. 12 is a block diagram illustrating an electronic system 1200 to detect a presence of a conductive object on a capacitive sensor array 1220, in accordance with various embodiments.

The electronic system 1200 includes a processing device 1210, the capacitive sensor array 1220, touch-sensor buttons 1240, host processor 1250, embedded controller 1260, and non-capacitance sensor elements 1270. The processing device 1210 may include analog and/or digital general-purpose input/output ("GPIO") ports 1207. GPIO ports 1207 may be programmable.

A digital block array of the processing device 1210 may be configured to implement a variety of digital logic circuits (e.g., DACs, digital filters, or digital control systems) using, in one embodiment, configurable user modules ("UMs"). The digital block array may be coupled to a system bus. Processing device 1210 may also include memory, such as random access memory ("RAM") 1205 and program flash 1204. RAM 1205 may be static RAM ("SRAM"), and program flash 1204 may be a non-volatile storage, which may be used to store firmware (e.g., control algorithms executable by processing core 1202 to implement operations described herein). The memory may include instructions that when executed perform the method described herein. Processing device 1210 may also include a microcontroller unit ("MCU") 1203 coupled to the memory and the processing core 1202.

As illustrated, capacitance sensor 1201 may be integrated into processing device 1210. Capacitance sensor 1201 may include analog I/O for coupling to an external component, such as capacitive sensor array 1220, touch-sensor buttons 1240, and/or other devices. Capacitance sensor 1201 and processing device 1210 are described in more detail below.

The embodiments described herein can be used in any capacitive sensor array application, for example, the capacitive sensor array 1220 may be a touchscreen, a touchpad, a touch-sensor slider, or touch-sensor buttons 1240 (e.g., capacitance sensor buttons). Embodiments described herein may include, but not be limited to, notebook pointer operations, lighting control (dimmer), volume control, graphic equalizer control, speed control, or other control operations requiring gradual or discrete adjustments. It will also be noted that these embodiments of capacitive sense implementations may be used in conjunction with non-capacitive sensor elements 1270, including but not limited to pick buttons, sliders (e.g., display brightness and contrast), scroll-wheels, multi-media control (e.g., volume, track advance) handwriting recognition, and numeric keypad operation.

In one embodiment, the electronic system 1200 includes a capacitive sensor array 1220 of sensor elements coupled to the processing device 1210 via bus 1221. In an embodiment, the capacitive sensor array may include a sensor matrix and conductor routing of one or more of FIGS. 4-10. The capacitive sensor array 1220 of the sensor elements may include a one-dimensional sensor array in one embodiment and a two dimensional sensor array in another embodiment. Alternatively or additionally, the capacitive sensor array 1220 of the sensor elements may have more dimensions. The capacitive sensor array 1220 may employ projected capacitive technology in which the capacitive sensor elements of the capacitive sensor array are formed in one or more layers upon a substrate (not shown) of the capacitive sensor array 1220. For example, the capacitive sensor elements may be patterned over an image display (e.g., a liquid crystal display) in one or more layers of transparent conducting film deposited on a glass, plastic, or other transparent substrate. A protective transparent layer (e.g., glass or plastic film) may cover the capacitive sensor elements to shield them from environmental damage. In another embodiment the substrate, or protective layer, or both substrate and protective layer may be opaque.

Also, in one embodiment, the capacitive sensor array 1220 of the sensor elements may be sliders, touchpads, touch-screens, or other sensing devices. In another embodiment, the electronic system 1200 includes touch-sensor buttons 1240 coupled to the processing device 1210 via bus 1241. Touch-sensor buttons 1240 may include a single-dimension or multi-dimension sensor array. The single- or multi-dimension sensor array may include multiple sensor elements. For a touch-sensor button, the sensor elements may be coupled together to detect a presence of a conductive object over the entire surface of the sense device. Alternatively, the touch-sensor buttons 1240 may have a single sensor element to detect the presence of a conductive object. In one embodiment, touch-sensor buttons 1240 may include a capacitive sensor element. Capacitive sensor elements may be used as non-contact sensor elements. These sensor elements, when protected by an insulating layer, offer resistance to severe environments.

The electronic system 1200 may include any combination of one or more of the capacitive sensor array 1220, and/or touch-sensor buttons 1240. In another embodiment, the electronic system 1200 may also include non-capacitance sensor elements 1270 coupled to the processing device 1210 via bus 1271. The non-capacitance sensor elements 1270 may include buttons, light emitting diodes ("LEDs"), information displays (e.g., LCD, AMOLED) and other user interface devices, such as a mouse, a keyboard, or other functional keys that do not require capacitance sensing. In one embodiment, busses 1271, 1241, and 1221 may be a single bus. Alternatively, these buses may be configured into any combination of one or more separate buses.

Processing device 1210 may include internal oscillator/clocks 1206 and communication block ("COM") 1208. The oscillator/clocks block 1206 provides clock signals to one or more of the components of processing device 1210. Communication block 1208 may be used to communicate with an external component, such as a host processor 1250, via host interface ("I/F") line 1251. Alternatively, processing device 1210 may also be coupled to an embedded controller 1260 to communicate with the external components, such as host processor 1250. In one embodiment, the processing device 1210 is configured to communicate with the embedded controller 1260 or the host processor 1250 to send and/or receive data. In one embodiment, the processing device 1210 contains all the functionality of the host 1250 such that host interface line 1251 is not present.

Processing device 1210 may reside on a common carrier substrate such as, for example, an integrated circuit ("IC") die substrate, a multi-chip module substrate, or the like. Alternatively, the components of processing device 1210 may be one or more separate integrated circuits and/or discrete components. In one exemplary embodiment, processing device 1210 may be the Programmable System on a Chip ("PSoC®") processing device, developed by Cypress Semiconductor Corporation, San Jose, Calif. Alternatively, processing device 1210 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It will also be noted that the embodiments described herein are not limited to having a configuration of a processing device coupled to the host processor 1250, but may include a system that measures the capacitance on the sense device and sends the raw data to another host computer where it is analyzed by an application. In effect, the processing that is done by processing device 1210 may also be done in the host computer.

It is noted that the processing device 1210 of FIG. 12 may measure capacitance using various techniques, such as self-capacitance sensing and mutual-capacitance sensing. The self-capacitance sensing mode is also called single-electrode sensing mode, as each sensor element needs only one connection wire to the sensing circuit. For the self-capacitance sensing mode, touching the dielectric surface of capacitive sensor array 1220 proximate to a sensor element increases the sensor capacitance as the finger capacitance is added to the sensor capacitance. The mutual-capacitance change is detected in the mutual-capacitance-sensing mode, wherein each sensor element uses at least two electrodes: one is a transmitter (TX) electrode and the other is a receiver (RX) electrode. When a finger touches the dielectric surface of capacitive sensor array 1220 proximate to the crossing of a transmit and receive electrode of the capacitance sensor array 1220, the capacitive coupling between the receiver electrode and the transmitter electrode of the capacitance sensor array is decreased as the finger shunts part of the electric field to ground (e.g., chassis or earth). A stylus 1290 used to provide input to the capacitive sensor array 1220 may be active or passive. In some embodiments, the processing device 1210 may provide multi-touch capability through simultaneously detecting multiple conductive objects proximate to different regions of the capacitive sensor array 1220. In an embodiment, the processing device 1210 may include and/or provide the functionality of one or more of the sensing module 106, the scan module 150, the presence module 160, and the position module 170, as described with respect to the figures above.

Capacitance sensor 1201 may be integrated into the IC of the processing device 1210, or alternatively, in a separate IC. The capacitance sensor 1201 may include relaxation oscillator (RO) circuitry, a sigma delta modulator (also referred to as CSD) circuitry, charge transfer circuitry, charge accumulation circuitry, or the like, for measuring capacitance as would be appreciated by one of ordinary skill in the art having the benefit of this disclosure. Alternatively, descriptions of capacitance sensor 1201 may be generated and compiled for incorporation into other integrated circuits. For example, behavioral level code describing capacitance sensor 1201, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 1201. It will be noted that the components of the electronic system 1200 may include only some or all of the discrete components described above, or some combination thereof.

In one embodiment, electronic system 1200 is used in a notebook computer. Alternatively, the electronic device may be used in other applications, such as a mobile handset, a personal data assistant ("PDA"), an electronic tablet, a keyboard, a television, a remote control, a monitor, a handheld multi-media device, a handheld video player, a handheld gaming device, or a control panel.

The above description is intended to be illustrative, and not restrictive. For example, the above-described embodiments (or one or more aspects thereof) may be used in combination with each other. Other embodiments will be apparent to those of skill in the art upon reviewing the above description. In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. In the event of inconsistent usages between this document and those documents so incorporated by reference, the usage in the incorporated reference(s) should be considered supplementary to that of this document; for irreconcilable inconsistencies, the usage in this document supersedes the usage in any incorporated references.

Although the claimed subject matter has been described with reference to specific embodiments, it will be evident that various modifications and changes may be made to these embodiments without departing from the broader spirit and scope of what is claimed. Accordingly, the specification and drawings are to be regarded in an illustrative rather than a restrictive sense. The scope of the claims should be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended; a system, device, article, or process that includes elements in addition to those listed after such a term in a claim are still deemed to fall within the scope of that claim. Moreover, in the following claims, the terms "first," "second," and "third," etc. are used merely as labels and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims.

What is claimed is:

1. An apparatus comprising:
   a sensing area bounded by a plurality of edges;
   a sensor matrix located in the sensing area;
   a plurality of conductors located in the sensing area and configured to couple each sensor of the sensor matrix to a sensing module, wherein not one of the plurality of conductors is routed between any two columns of sensors of the sensor matrix;
   a first sensor, wherein the first sensor is in a first column of sensors and in a first row of sensors of the sensor matrix, wherein the sensors in the first row of sensors are coupled to one another, within the sensing area, through a first row electrode of the sensor matrix;
   a second sensor, wherein the second sensor is in the first column of sensors and in a second row of sensors of the sensor matrix, wherein the sensors in the second row of sensors are coupled to one another, within the sensing area, through a second row electrode of the sensor matrix;
   a first conductor, of the plurality of conductors, the first conductor coupled to the first sensor and configured to be coupled to the sensing module; and a second conductor, of the plurality of conductors, the second conductor coupled to the second sensor and configured to be coupled to the sensing module, wherein the first sensor consumes a first area, the second sensor and a length of the first conductor reside within a second area that is smaller than or equal to the first area consumed by the first sensor, and wherein the length of the first conductor is routed between an edge of the sensing area and the second sensor.

2. The apparatus of claim 1, further comprising:
a third sensor, wherein the third sensor is in the first column of sensors and in a third row of sensors of the sensor matrix, wherein the sensors in the third row of sensors are coupled to one another through a third row electrode; and
a third conductor located in the sensing area, the third conductor coupled to the third sensor and configured to be coupled to the sensing module,
wherein the third sensor, a length of the second conductor, and another length of the first conductor reside within a third area that is smaller than or equal to the first area consumed by the first sensor, and wherein the length of the second conductor and the other length of the first conductor are routed between the edge of the sensing area and the third sensor.

3. The apparatus of claim 1, further comprising:
a third sensor, wherein the third sensor is in a second column of sensors and in a third row of sensors of the sensor matrix, wherein the sensors in the third row of sensors are coupled to one another through a third row electrode;
a fourth sensor, wherein the fourth sensor is in the second column of sensors and in a fourth row of sensors of the sensor matrix, wherein the sensors in the fourth row of sensors are coupled to one another through a fourth row electrode;
a third conductor located in the sensing area, the third conductor coupled to the third sensor and configured to be coupled to the sensing module; and
a fourth conductor located in the sensing area, the fourth conductor coupled to the fourth sensor and configured to be coupled to the sensing module,
wherein the third sensor consumes a third area, and wherein the fourth sensor and a length of the third conductor reside within a fourth area that is smaller than or equal to the third area consumed by the third sensor, and wherein the length of the third conductor is routed between another edge of the sensing area and the fourth sensor.

4. The apparatus of claim 1, wherein the sensor matrix comprises a plurality of rows of electrodes and a plurality of columns of electrodes, wherein the plurality of rows of electrodes are in galvanic isolation from the plurality of columns of electrodes, and wherein each sensor of the sensor matrix includes a crossing of one of the plurality of row electrodes with one of the plurality of column electrodes.

5. The apparatus of claim 4, wherein the plurality of rows of electrodes, the plurality of columns of electrodes, the first conductor, and the second conductor are formed upon a single layer of a substrate.

6. The apparatus of claim 4, wherein the plurality of rows of electrodes, the plurality of columns of electrodes, the first conductor, and the second conductor include one or more transparent conductive materials.

7. The apparatus of claim 4, wherein the first sensor includes a first portion of the first row electrode and a first portion of a first column electrode and the second sensor includes a first portion of the second row electrode and a second portion of the first column electrode, wherein a total area consumed by the first portion of the second row electrode and the second portion of the first column electrode is smaller than a total area consumed by the first portion of the first row electrode and the first portion of the first column electrode.

8. An apparatus comprising:
a sensing area bounded by a plurality of edges;
a sensor matrix located in the sensing area;
a plurality of conductors located in the sensing area and configured to couple each sensor of the sensor matrix to a sensing module, wherein not one of the plurality of conductors is routed between any two rows of sensors of the sensor matrix;
a first sensor, wherein the first sensor is in a first row of sensors and in a first column of sensors of the sensor matrix, wherein each sensor in the first column of sensors is coupled to one another, within the sensing area, through a first column electrode of the sensor matrix;
a second sensor, wherein the second sensor is in the first row of sensors and in a second column of sensors of the sensor matrix, wherein each sensor in the second column of sensors is coupled to one another, within the sensing area, through a second column electrode of the sensor matrix;
a first conductor, of the plurality of conductors, the first conductor coupled to the first sensor and configured to be coupled to the sensing module; and
a second conductor, of the plurality of conductors, the second conductor coupled to the second sensor and configured to be coupled to the sensing module,
wherein the first sensor consumes a first area, and wherein the second sensor and a length of the first conductor reside within a second area that is smaller than or equal to the first area consumed by the first sensor, and wherein the length of the first conductor is routed between an edge of the sensing area and the second sensor.

9. The apparatus of claim 8, further comprising:
a third sensor, wherein the third sensor is in the first row of sensors and in a third column of sensors of the sensor matrix, wherein the sensor of the third column of sensors are coupled to one another through a third column electrode; and
a third conductor located in the sensing area, the third conductor coupled to the third sensor and configured to be coupled to the sensing module,
wherein the third sensor, a length of the second conductor, and another length of the first conductor reside within a third area that is smaller than or equal to the first area consumed by the first sensor, and wherein the length of the second conductor and the other length of the first conductor are routed between the edge of the sensing area and the third sensor.

10. The apparatus of claim 8, further comprising:
a third sensor, wherein the third sensor is in a second row of sensors and in a third column of sensors of the sensor matrix, wherein the sensors of the third column of sensors are coupled to one another through a third column electrode;
a fourth sensor, wherein the fourth sensor is in the second row of sensors and in a fourth column of sensors of the sensor matrix, wherein the sensors of the fourth column of sensors are coupled to one another through a fourth column electrode;
a third conductor located in the sensing area, the third conductor coupled to the third sensor and configured to be coupled to the sensing module; and a fourth conductor located in the sensing area, the fourth conductor coupled to the fourth sensor and configured to be coupled to the sensing module, wherein the third sensor consumes a third area, and wherein the fourth sensor and a length of the third conductor reside within a fourth area that is smaller than or equal to the third area consumed by the third sensor, and wherein the length of the third conductor is routed between another edge of the sensing area and the fourth sensor.

11. The apparatus of claim 8, wherein the sensor matrix is comprises a plurality of rows of electrodes and a plurality of columns of electrodes, wherein the plurality of rows of electrodes are in galvanic isolation from the plurality of columns of electrodes, and wherein each sensor of the sensor matrix includes a crossing of one of the plurality of row electrodes with one of the plurality of column electrodes.

12. The apparatus of claim 11, wherein the plurality of rows of electrodes, the plurality of columns of electrodes, the first conductor, and the second conductor are formed in a single layer of a substrate.

13. The apparatus of claim 11, wherein the plurality of rows of electrodes, the plurality of columns of electrodes, the first conductor, and the second conductor are transparent conductive materials.

14. The apparatus of claim 11, wherein the first sensor includes a first portion of a first row electrode and a first portion of the first column electrode and the second sensor includes a second portion of a second row electrode and a second portion of the first column electrode, wherein a total area consumed by the second portion of the second row electrode and the second portion of the first column electrode is smaller than a total area consumed by the first portion of the first row electrode and the first portion of the first column electrode.

15. A system comprising:
a display device configured to display images within a display area;
a sensor matrix residing, at least in part, within the bounds of the display area;
a sensing module configured to sense touch input;
a plurality of conductors located in the display area and configured to couple each sensor of the sensor matrix to the sensing module, wherein not one of the plurality of conductors is routed between any two columns of sensors of the sensor matrix;
a first conductor of the plurality of conductors configured to couple a first sensor of the sensor matrix to the sensing module; and
a second conductor of the plurality of conductors configured to couple a second sensor of the sensor matrix to the sensing module,
wherein the first sensor is in a first column of sensors and in a first row of sensors of the sensor matrix and the sensors in the first row of sensors are coupled to one another within the display area, wherein the second sensor is in the first column of sensors and in a second row of sensors of the sensor matrix and the sensors in the second row of sensors are coupled to one another within the display area, and wherein the first sensor consumes a first area, the second sensor and a segment of the first conductor reside within a second area that is smaller than or equal to the first area consumed by the first sensor, and the segment of the first conductor is routed between an edge of the display area and the second sensor.

16. The system of claim 15, wherein the sensor matrix comprises a plurality of rows of electrodes and a plurality of columns of electrodes, wherein the plurality of rows of electrodes are in galvanic isolation from the plurality of columns of electrodes, and wherein each sensor of the sensor matrix includes a crossing of one of the plurality of row electrodes with one of the plurality of column electrodes.

17. The system of claim 16, wherein the sensing module is configured to detect a touch input based on a signal received through the first conductor, wherein the signal indicates a change in mutual capacitance of a sensor in the first row of sensors.

\* \* \* \* \*